(12) United States Patent
Lu et al.

(10) Patent No.: US 8,745,145 B2
(45) Date of Patent: Jun. 3, 2014

(54) METHOD AND SYSTEM FOR TRANSMITTING LARGE MESSAGE MODE CPM MESSAGES

(75) Inventors: Yan Lu, Shenzhen (CN); Ghazanfar Ali, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 47 days.

(21) Appl. No.: 13/257,764

(22) PCT Filed: Nov. 27, 2009

(86) PCT No.: PCT/CN2009/075187
§ 371 (c)(1),
(2), (4) Date: Feb. 8, 2012

(87) PCT Pub. No.: WO2011/017866
PCT Pub. Date: Feb. 17, 2011

(65) Prior Publication Data
US 2012/0131114 A1  May 24, 2012

(30) Foreign Application Priority Data

Aug. 11, 2009 (CN) .......................... 2009 1 0164094

(51) Int. Cl.
G06F 15/16 (2006.01)
H04L 12/58 (2006.01)
H04L 12/64 (2006.01)
H04L 29/06 (2006.01)
H04L 12/66 (2006.01)

(52) U.S. Cl.
CPC .......... H04L 12/6418 (2013.01); H04L 12/589 (2013.01); H04L 51/38 (2013.01); H04L 65/1006 (2013.01); H04L 69/08 (2013.01); H04L 12/66 (2013.01)
USPC ........... 709/206; 709/227; 709/246; 709/203; 709/230; 341/50; 341/88

(58) Field of Classification Search
USPC ......... 709/206, 202–203, 227–228, 230–232, 709/246; 341/50, 88; 455/72, 466; 370/312, 370/315, 428; 725/32
See application file for complete search history.

(56) References Cited

U.S. PATENT DOCUMENTS 6,956,832 B1 * 10/2005 Muhonen et al. ............. 370/310
2006/0155814 A1 * 7/2006 Bennett et al. ................ 709/207

(Continued)

FOREIGN PATENT DOCUMENTS

CN 1801814 A 7/2006
CN 1842179 A 10/2006

(Continued)

OTHER PUBLICATIONS

RFC4975_MSRP.*

(Continued)

*Primary Examiner* — Joseph E Avellino
*Assistant Examiner* — Deforrest Bailey
(74) *Attorney, Agent, or Firm* — Oppedahl Patent Law Firm LLC

(57) ABSTRACT

The disclosure discloses a method and system for transmitting a large message mode CPM message, both of which enable the respective establishment of Message Session Relay Protocol (MSRP) links between a CPM client of a sender and an originating participation function entity, between the originating participation function entity and a terminating participation function entity, and between the terminating participation function entity and an inter-working function entity, wherein the establisher of each segment of MSRP link obtains the MSRP connection parameters of the opposite end through media negotiations and establishes the MSRP link according to the MSRP connection parameters; the CPM client of the sender sends the large message mode CPM message to the inter-working function entity through each segment of established MSRP link in sequence, the inter-working function entity performs a protocol conversion on the received the large message mode CPM message and then transmits the converted message to a non-CPM system. The method and system of the disclosure enable the transmission of a large message mode CPM message to an unavailable CPM system user, thus improving user experience.

19 Claims, 10 Drawing Sheets

(56) References Cited

U.S. PATENT DOCUMENTS

| | | | |
|---|---|---|---|
| 2007/0156909 A1* | 7/2007 | Osborn et al. | 709/227 |
| 2008/0113679 A1 | 5/2008 | Sung et al. | |
| 2008/0114881 A1* | 5/2008 | Lee et al. | 709/227 |
| 2009/0276499 A1* | 11/2009 | Mu | 709/206 |
| 2009/0279455 A1* | 11/2009 | Wang et al. | 370/260 |
| 2010/0011069 A1* | 1/2010 | Haruna et al. | 709/206 |
| 2011/0153764 A1* | 6/2011 | Li et al. | 709/206 |

FOREIGN PATENT DOCUMENTS

| | | |
|---|---|---|
| CN | 101207577 A | 6/2008 |
| CN | 101227418 A | 7/2008 |
| CN | 101291274 A | 10/2008 |
| CN | 101374118 A | 2/2009 |
| CN | 101374254 A | 2/2009 |
| KR | 20080043266 A | 5/2008 |

OTHER PUBLICATIONS

International Search Report in international application number: PCT/CN2009/075187, mailed on May 20, 2010.

English Translation of the Written Opinion of the International Search Authority in international application No. PCT/CN2009/075187, mailed on May 20, 2010.

OMA Converged IP Messaging System Description; OMA-TS-CPM_System_Description_V1_0-20090804-D Aug. 4, 2009.

Campbell B et al: "The Message Session Relay Protocol (MSRP)" Sep. 1, 2007.

Gertjan Van Wingerde et al: "SD-Large Messaging Mode Interworking Flow" Apr. 10, 2009.

"Converged IP Messaging Architecture; OMA-AD-CPM-V1_0-20071004-D" Oct. 4, 2007.

Supplementary European Search Report in European application No. 09848196.3 , mailed on May 23, 2013.

\* cited by examiner the establisher of each segment of MSRP link obtains the MSRP connection parameters of an opposite end through media negotiations and establishes the MSRP link according to the MSRP connection parameters;

the CPM client of the sender sends the large message mode CPM message to the inter-working function entity through each segment of established MSRP link in sequence; and the inter-working function entity performs a protocol conversion on the received contents and then transmits the converted contents to a non-CPM system.

METHOD AND SYSTEM FOR TRANSMITTING LARGE MESSAGE MODE CPM MESSAGES

TECHNICAL FIELD

The disclosure relates to the field of mobile communications, and in particular to a method and system for transmitting a large message mode Converged IP Messaging (CPM) message.

BACKGROUND

CPM has been proposed by Open Mobile Aillance (OMA) in 2005 to realize the intercommunication of multiple message services and provide uniform message services and perfect, consistent and convenient message service experience. CPM merges multiple existing message services including an Instant Message (IM), a Push-To-Talk Over Cellular (POC), a Mobile E-Email (MEM), a short messaging service (SMS), and a Multimedia Messaging Service (MMS) and the like.

OMA is currently formulating a CPM V1.0 standard. Service forms of CPM include: a CPM message based on a pager mode, a large message mode CPM message based on a session mode, and a session-based CPM session service. Before using such services, a user needs to register on and log into a CPM system, that is, to be 'online'.

A Session Initiation Protocol (SIP) message is used to transmit a pager-mode message between CPM clients at CPM recipient and CPM sender sides and a CPM enabler. An SIP MESSSAGE cannot be used by a sender terminal to send a large message mode CPM message with a size beyond a limit (e.g. 1300 bytes).

A CPM service supports a CPM pre-defined group and a temporary group (CPM Ad-hoc group), a CPM subscriber can send a CPM paging message to a CPM Ad-hoc group or CPM pre-defined group, however, a message with a limit-beyond size cannot be included by an SIP MESSSAGE.

In existing specifications, there has been proposed no technical solution to the transmission of a large message mode CPM message to the terminal of an unavailable subscriber recipient via a non-CPM system in the case where a CPM subscriber sends a large message mode CPM message to a target CPM subscriber which is unavailable (offline or currently having no communication willing) or to a group in which one or multiple unavailable subscribers exist.

SUMMARY

On this ground, the disclosure provides a method and system for transmitting a large message mode CPM message to address the problem existing in related technologies that a CPM client cannot send a large message mode CPM message to an unavailable CPM system recipient.

In order to achieve the purpose above, the technical solution of the disclosure is realized as follows:

A method for transmitting a large message mode Converged IP Messaging (CPM) message, which is used for transmitting a large message mode CPM message from a CPM client of sender to a target user, when a recipient is an unavailable CPM system user, the method comprises:

Message Session Relay Protocol (MSRP) links are respectively established between the CPM client of the sender and an originating participation function entity, between the originating participation function entity and a terminating participation function entity, and between the terminating participation function entity and an inter-working function entity; the establisher of each segment of MSRP link obtains the MSRP connection parameters of an opposite end through media negotiations and establishes the MSRP link according to the MSRP connection parameters;

the CPM client of the sender sends the large message mode CPM message to the inter-working function entity through each segment of established MSRP link in sequence; and the inter-working function entity performs a protocol conversion on the received contents and then transmits the converted contents to a non-CPM system.

The process of media negotiations may comprise:

the CPM client of the sender sends a first session invitation message which is received by the originating participation function entity; the originating participation function entity sends a second session invitation message which is received by the terminating participation function entity; the terminating participation function entity sends a third invitation message which is received by a network selection function entity; the network selection function entity selects the inter-working function entity according to the third session invitation message and sends a fourth session invitation message which is received by the inter-working function entity;

the inter-working function entity sends a fourth success response message which is received by the network selection function entity; the network selection function entity sends a third success response message which is received by the terminating participation function entity; the terminating participation function entity sends a second success response message which is received by the originating participation function entity; and the originating participation function entity sends a first success response message which is received by the CPM client of the sender.

The method may further comprise:

after receiving the first success response message, sending a first acknowledgement message, by the CPM client of the sender, which is received by the originating participation function entity; after receiving the first acknowledgement message, sending a second acknowledgement message, by the originating participation function entity, which is received by the terminating participation function entity; after receiving the second acknowledgement message, sending a third acknowledgement message, by the terminating participation function entity, which is received by the network selection function entity; and after receiving the third acknowledgement message, sending a fourth acknowledgement message, by the network selection function entity, which is received by the inter-working function entity; or after the terminating participation function entity receives the third success response message, sending a third acknowledgement message, by the terminating participation function entity, which is received by the network selection function entity; after the originating participation function entity receives the second success response message, sending a second acknowledgement message, by the originating participation function entity, which is received by the terminating participation function entity; and after the CPM client of the sender receives the first success response message, sending a first acknowledgement message, by the CPM client of the sender, which is received by the originating participation function entity.

When the MSRP link between the CPM client of the sender and the originating participation function entity is a first MSRP link, the MSRP link between the originating participation function entity and the terminating participation function entity is a second MSRP link, the MSRP link between the terminating participation function entity and the inter-working function entity is a third MSRP link, and the MSRP connection parameters of the inter-working function entity are included in the fourth and third success response messages, the MSRP connection parameters of the terminating participation function entity are included in the second success response message sent by the terminating participation function entity, and the MSRP connection parameters of the originating participation function entity are included in the first success response message sent by the originating participation function entity, then, the first, second and third MSRP links are established as follows:

the CPM client of the sender establishes the first MSRP link according to the MSRP connection parameters of the originating participation function entity; the originating participation function entity establishes the second MSRP link according to the MSRP connection parameters of the terminating participation function entity; and the terminating participation function entity establishes the third MSRP link according to the MSRP connection parameters of the inter-working function entity.

The first MSRP link may be established when the client of the sender receives the first success response message.

The second MSRP link may be established after the originating participation function entity receives the second success response message, or the first acknowledgement message or an MSRP media transmission request; and the third MSRP link may be established after the terminating participation function entity receives the second acknowledgement message, or the third success response message or an MSRP media transmission request.

During a period between establishing the first MSRP link and establishing the second MSRP link, the method may further comprise:

the CPM client of the sender sends a first media transmission request, and the originating participation function entity receives the first media transmission request;

and the MSRP connection parameters of the terminating participation function entity are obtained from the second success response message or from path head information of the first media transmission request.

During a period between establishing the second MSRP link and establishing the third MSRP link, the method may further comprise:

the originating participation function entity transmits the media data included in the received first media transmission request via a second media transmission request, and the terminating participation function entity receives the second media transmission request;

and the MSRP connection parameters of the inter-working function entity are obtained from the third success response message or from path head information of the second media transmission request.

When the MSRP connection parameters of the CPM client of the sender are included in the first session invitation message sent by the CPM client of the sender, the MSRP connection parameters of the originating participation function entity are included in the second session invitation message sent by the originating participation function entity, and the MSRP connection parameters of the terminating participation function entity are included in the third session invitation message sent by the terminating participation function entity and the fourth session invitation message sent by the network selection function entity, then, the first, second and third MSRP links may be established as follows:

the originating participation function entity establishes the first MSRP link according to the MSRP connection parameters of the CPM client of the sender; the terminating participation function entity establishes the second MSRP link according to the MSRP connection parameters of the originating participation function entity; and the inter-working function entity establishes the third MSRP link according to the MSRP connection parameters of the terminating participation function entity.

The first MSRP link may be established after the originating participation function entity receives the first acknowledgement message;

the second MSRP link may be established after the terminating participation function entity receives the second acknowledgement message;

and the third MSRP link may be established after the inter-working function entity receives the fourth acknowledgement message.

When the MSRP connection parameters of the terminating participation function entity are included in the third session invitation message sent by the terminating participation function entity and the fourth session invitation message sent by the network selection function entity; the MSRP connection parameters of the originating participation function entity are included in the first success response message sent by the originating participation function entity; the MSRP connection parameters of the originating participation function entity are included in the second session invitation message sent by the originating participation function entity, or the MSRP connection parameters of the terminating participation function entity are included in the second success response message sent by the terminating participation function entity, the first MSRP link between the CPM client of the sender and the originating participation function entity is established by the CPM client of the sender according to the MSRP connection parameters of the originating participation function entity; the third MSRP link between the inter-working function entity and the terminating participation function entity is established by the inter-working function entity according to the MSRP connection parameters of the terminating participation function entity, and the second MSRP link between the terminating participation function entity and the originating participation function entity is established by the terminating participation function entity according to the MSRP connection parameters of the originating participation function entity, or established by the originating participation function entity according to the MSRP connection parameters of the terminating participation function entity.

The first MSRP link may be established after the CPM client of the sender receives the first success response message;

the third MSRP link may be established after the inter-working function entity receives the fourth acknowledgement message;

when being established by the terminating participation function entity, the second MSRP link may be established after the terminating participation function entity receives the second acknowledgement message; and when being established by the originating participation function entity, the second MSRP link may be established after the originating participation function entity receives the second success response message, or the first acknowledgement message, or an MSRP media transmission request.

During a period between establishing the first MSRP link and establishing the second MSRP link, the method may further comprise:

the CPM client of the sender sends a first media transmission request, the originating participation function entity receives the first media transmission request;

and the MSRP connection parameters of the terminating participation function entity are obtained from the second success response message or from path head information of the first media transmission request.

The establishment process of the MSRP links may be as follows:

an establisher achieves establishment by initiating a link establishment request according to the MSRP connection parameters of a neighboring entity; or the establisher selects an existing MSRP link with a matched host, port and/or MSRP URI (Universal Resource Identifier) as an MSRP link to be established.

The method may further comprise:

after receiving the large message mode CPM message subjected to a protocol conversion, the non-CPM system returns a reception acknowledgement message to the inter-working function entity; and after receiving the reception acknowledgement message, the inter-working function entity sends an MSRP response message which reaches the CPM client of the sender finally.

The communication between any two of the CPM client of the sender, the originating participation function entity, the terminating participation function entity and the inter-working function entity may be realized in any one of the following three manners:

manner 1: the communication between all the function entities is realized via routing of an SIP/IP core network;

manner 2: the communication between part of the function entities is realized via routing of an SIP/IP core network, and the communication between the function entities except the part of the function entities is realized base on direct communication link between each other or via other forwarding devices except for the SIP/IP core network; and manner 3: the communication between all the function entities is realized base on direct communication link between each other or via other forwarding devices except the SIP/IP core network.

A method for transmitting a large message mode CPM (Converged IP Messaging) message, which is used for transmitting a large message mode CPM message from a CPM client of a sender to a target group, when a recipient is an unavailable CPM system user in the target group, the method comprises:

MSRP links are respectively established between a CPM client of the sender and an originating participation function entity, between the originating participation function entity and a CPM control function entity, between the CPM control function entity and a terminating participation function entity, and between the terminating participation function entity and an inter-working function entity; an establisher of each segment of MSRP link obtains the MSRP connection parameters of the opposite end through media negotiations and establishes the MSRP link according to the MSRP connection parameters;

the CPM client of the sender sends the large message mode CPM message to the inter-working function entity through each established MSRP link in sequence; and the inter-working function entity performs a protocol conversion on the received contents of the large message mode CPM message and then transmits the converted contents to a non-CPM system.

The process of media negotiations may be as follows:

the CPM client of the sender sends a first session invitation message which is received by the originating participation function entity; the originating participation function entity sends a second session invitation message which is received by the CPM control function entity; the CPM control function entity sends a third invitation message which is received by the terminating participation function entity; the terminating participation function entity sends a fourth session invitation message which is received by a network selection function entity; and the network selection function entity selects the inter-working function entity according to the fourth session invitation message and sends a fifth session invitation message which is received by the inter-working function entity;

the inter-working function entity sends a fifth success response message which is received by the network selection function entity; the network selection function entity sends a fourth success response message which is received by the terminating participation function entity; the terminating participation function entity sends a third success response message which is received by the CPM control function entity; the CPM control function entity sends a second success response message which is received by the originating participation function entity; and the originating participation function entity sends a first success response message which is received by the CPM client of the sender.

The method may further comprise:

after the CPM client of the sender receives the first success response message, sending a first acknowledgement message, by the CPM client of the sender, which is received by the originating participation function entity; after the originating participation function entity receives the first acknowledgement message, sending a second acknowledgement message, by the originating participation function entity, which is received by the CPM control function entity; after the CPM control function entity receives the second acknowledgement message, sending a third acknowledgement message, by the CPM control function entity, which is received by the terminating participation function entity; after the terminating participation function entity receives the third acknowledgement message, sending a fourth acknowledgement message, by the terminating participation function entity, which is received by the network selection function entity; and after the network selection function entity receives the fourth acknowledgement message, sending a fifth acknowledgement message, by the network selection function entity, which is received by the inter-working function entity; or after the terminating participation function entity receives the fourth success response message, sending a fourth acknowledgement message, by the terminating participation function entity, which is received by the network selection function entity; after the network selection function entity receives the fourth acknowledgement message, sending a fifth acknowledgement message, by the network selection function entity, which is received by the inter-working function entity; after the CPM control function entity receives the third success response message, sending a third acknowledgement message, by the CPM control function entity, which is received by the terminating participation function entity; after the originating participation function entity receives the second success response message, sending a second acknowledgement message, by the originating participation function entity, which is received by the CPM control function entity; and after the CPM client of the sender receives the first success response message, sending a first acknowledgement message, by the CPM client of the sender, which is received by the originating participation function entity.

When the MSRP link between the CPM client of the sender and the originating participation function entity is a first MSRP link, the MSRP link between the originating participation function entity and the terminating participation function entity is a second MSRP link, the MSRP link between the CPM control function entity and the terminating participation function entity is a third MSRP link, the MSRP link between the terminating participation function entity and the inter-working function entity is a fourth MSRP link, and the MSRP connection parameters of the inter-working function entity are included in the fifth and fourth success response messages; the MSRP connection parameters of the terminating participation function entity are included in the third success response message sent by the terminating participation function entity, and the MSRP connection parameters of the CPM control function entity are included in the second success response message sent by the CPM control function entity; and the MSRP connection parameters of the originating participation function entity are included in the first success response message sent by the originating participation function entity, then, the first, second, third and fourth MSRP links may be established as follows:

the CPM client of the sender establishes the first MSRP link according to the MSRP connection parameters of the originating participation function entity; the originating participation function entity establishes the second MSRP link according to the MSRP connection parameters of the CPM control function entity; the CPM control function entity establishes the third MSRP links according to the MSRP connection parameters of the terminating participation function entity; and the terminating participation function entity establishes the fourth MSRP link according to the MSRP connection parameters of the inter-working function entity.

The first MSRP link may be established when the client of the sender receives the first success response message.

The third MSRP link may be established when the CPM control function entity receives the third success response message or the second acknowledgement message.

The second MSRP link may be established after the originating participation function entity receives the second success response message, the first acknowledgement message or an MSRP media transmission request; and the fourth MSRP link may be established when the terminating participation function entity receives the third acknowledgement message or the fourth success response message or an MSRP media transmission request.

During a period between establishing the first MSRP link and establishing the second MSRP link, the method may further comprise:

the CPM client of the sender sends a first media transmission request, the originating participation function entity receives the first media transmission request;

and the MSRP connection parameters of the CPM control function entity are obtained from the second success response message or from path head information of the first media transmission request;

during a period between establishing the second MSRP link and establishing the third MSRP link, the method may further comprise:

the originating participation function entity transmits the media data included in the received first media transmission request via a second media transmission request, the CPM control function entity receives the second media transmission request;

and the MSRP connection parameters of the terminating participation function entity are obtained from the third success response message or from path head information of the second media transmission request;

during a period between establishing the third MSRP link and establishing the fourth MSRP link, the method may further comprise:

the CPM control function entity transmits the media data included in the received second media transmission request via a third media transmission request, the terminating participation function entity receives the third media transmission request;

and the MSRP connection parameters of the inter-working function entity are obtained from the fourth success response message or from path head information of the third media transmission request.

When the MSRP connection parameters of the CPM client of the sender are included in the first session invitation message sent by the CPM client of the sender, the MSRP connection parameters of the originating participation function entity are included in the second session invitation message sent by the originating participation function entity, the MSRP connection parameters of the CPM control function entity are included in the third session invitation message sent by the CPM control function entity, and the MSRP connection parameters of the terminating participation function entity are included in the fourth session invitation message sent by the terminating participation function entity and the fifth session invitation message sent by the network selection function entity, then, the first, second, third and fourth MSRP links may be established as follows:

the originating participation function entity establishes the first MSRP link according to the MSRP connection parameters of the CPM client of the sender; the CPM control function entity establishes the second MSRP link according to the MSRP connection parameters of the originating participation function entity; the terminating participation function entity establishes the third MSRP links according to the MSRP connection parameters of the CPM control function entity; and the inter-working function entity establishes the fourth MSRP link according to the MSRP connection parameters of the terminating participation function entity.

The first MSRP link may be established after the originating participation function entity receives the first acknowledgement message;

the second MSRP link may be established after the CPM control function entity receives the second acknowledgement message;

the third MSRP link may be established after the terminating participation function entity receives the third acknowledgement message; and the fourth MSRP link may be established after the inter-working function entity receives the fifth acknowledgement message.

When the MSRP connection parameters of the terminating participation function entity are included in the fourth session invitation message sent by the terminating participation function entity and the fifth session invitation message sent by the network selection function entity, and the MSRP connection parameters of the originating participation function entity are included in the first success response message sent by the originating participation function entity, the first MSRP link between the CPM client of the sender and the originating participation function entity is established by the CPM client of the sender according to the MSRP connection parameters of the originating participation function entity, and the fourth MSRP link between the inter-working function entity and the terminating participation function entity is established by the inter-working function entity according to the MSRP connection parameters of the terminating participation function entity;

when the MSRP connection parameters of the CPM control function entity are included in the third session invitation message sent by the CPM control function entity, the third MSRP link between the terminating participation function entity and the CPM control function entity is established by the terminating participation function entity according to the MSRP connection parameters of the CPM control function entity; or, when the MSRP connection parameters of the terminating participation function entity are included in the third success response message sent by the terminating participation function entity, the third MSRP link between the terminating participation function entity and the CPM control function entity is established by the CPM control function entity according to the MSRP connection parameters of the terminating participation function entity; and when the MSRP connection parameters of the originating participation function entity are included in the second session invitation message sent by the originating participation function entity, the second MSRP link between the CPM control function entity and the originating participation function entity is established by the CPM control function entity according to the MSRP connection parameters of the originating participation function entity; or, when the MSRP connection parameters of the CPM control function entity are included in the second success response message sent by the CPM control function entity, the second MSRP link between the CPM control function entity and the originating participation function entity is established by the originating participation function entity according to the MSRP connection parameters of the CPM control function entity.

The first MSRP link may be established after the CPM client of the sender receives the first success response message;

the fourth MSRP link may be established after the inter-working function entity receives the fifth acknowledgement message;

when being established by the CPM control function entity, the second MSRP link may be established after the CPM control function entity receives the second acknowledgement message; and when being established by the originating participation function entity, the second MSRP link may be established after the originating participation function entity receives the second success response message, or the first acknowledgement message or an MSRP media transmission request;

when being established by the terminating participation function entity, the third MSRP link may be established after the terminating participation function entity receives the third acknowledgement message; and when being established by the CPM control function entity, the third MSRP link may be established after the CPM control function entity receives the third success response message, or the second acknowledgement message or an MSRP media transmission request.

During a period between establishing the first MSRP link and establishing the second MSRP link, the method may further comprise:

the CPM client of the sender sends a first media transmission request, the originating participation function entity receives the first media transmission request;

and the MSRP connection parameters of the CPM control function entity are obtained from the second success response message or from path head information of the first media transmission request;

during a period between establishing the second MSRP link and establishing the third MSRP link, the method may further comprise:

the originating participation function entity sends a second media transmission request, the CPM control function entity receives the second media transmission request;

and the MSRP connection parameters of the terminating participation function entity are obtained from the third success response message or from path head information of the second media transmission request.

The establishment process of the MSRP links may be as follows:

an establisher achieves establishment by initiating a link establishment request according to the MSRP connection parameters of an opposite end; or the establisher selects an existing MSRP link with a matched host, port and/or MSRP URI as an MSRP link to be established.

The method may further comprise:

after receiving the large message mode CPM message subjected to a protocol conversion, the non-CPM system returns a reception acknowledgement message to the inter-working function entity; and after receiving the reception acknowledgement message, the inter-working function entity sends an MSRP response message which reaches the CPM client of the sender finally.

The communication between any two of the CPM client of the sender, the originating participation function entity, the CPM control function entity, the terminating participation function entity, the selection function entity and the inter-working function entity is realized in any one of the following three manners:

manner 1: the communication between all the function entities is realized via routing of an SIP/IP core network;

manner 2: the communication between part of the function entities is realized via routing of an SIP/IP core network, and the communication between the function entities except the part of the function entities is realized base on direct communication link between each other or via other forwarding devices except for the SIP/IP core network; and manner 3: the communication between all the function entities is realized base on direct communication link between each other or via other forwarding devices except the SIP/IP core network.

A system for transmitting a large message mode CPM message, comprises a CPM client of a sender, an originating participation function entity, a terminating participation function entity, a selection function entity and an inter-working function entity, wherein it is configured to establish MSRP links respectively between the CPM client of the sender and the originating participation function entity, between the originating participation function entity and the terminating participation function entity, and between the terminating participation function entity and the inter-working function entity, wherein an establisher of each segment of MSRP link is configured to obtain MSRP connection parameters of an opposite end through media negotiations and establish the segment of MSRP link according to the MSRP connection parameters;

the CPM client of the sender is further configured to send the large message mode CPM message to the inter-working function entity through each established segment of MSRP link in sequence; and the inter-working function entity is further configured to perform a protocol conversion on the received contents of the large message mode CPM message and then send the converted contents to a recipient of a non-CPM system.

Any two of the CPM client of the sender, the originating participation function entity, the terminating participation function entity, the selection function entity and the inter-working function entity are connected in any one of the following three ways:

Way 1: the connection between all the function entities is realized via an SIP/IP core network;

Way 2: the connection between part of the function entities is realized via an SIP/IP core network, and the other function entities except the part of the function entities are connected directly or via other forwarding devices except for the SIP/IP core network; and Way 3: all the function entities are connected directly or via other forwarding devices except for the SIP/IP core network.

A system for transmitting a large message mode CPM message, comprises a CPM client of a sender, an originating participation function entity, a CPM control function entity, a terminating participation function entity, a selection function entity and an inter-working function entity, wherein it is configured to establish MSRP links respectively between the CPM client of the sender and the originating participation function entity, between the originating participation function entity and the CPM control function entity, between the CPM control function entity and the terminating participation function entity, and between the terminating participation function entity and the inter-working function entity, wherein an establisher of each segment of MSRP link is configured to obtain MSRP connection parameters of an opposite end through media negotiations and establishes the segment of MSRP link according to the MSRP connection parameters;

the CPM client of the sender is further configured to send the large message mode CPM message to the inter-working function entity through each established segment of MSRP link in sequence; and the inter-working function entity is further configured to perform a protocol conversion on the received contents of the large message mode CPM message and then send the converted contents to a recipient of a non-CPM system.

Any two of the CPM client of the sender, the originating participation function entity, the CPM control function entity, the terminating participation function entity and the inter-working function entity are connected in any one of the following ways:

Way 1: the connection between all the function entities is realized via an SIP/IP core network;

Way 2: the connection between part of the function entities is realized via an SIP/IP core network, and the other function entities except the part of the function entities are connected directly or via other forwarding devices except for the SIP/IP core network; and Way 3: all the function entities are connected directly or via other forwarding devices except for the SIP/IP core network.

Through at least one of the solutions above, a large message mode CPM message is transmitted to an Inter-Working Function (IWF) through a media transmission link established between a CPM client of a sender and the IWF, the IWF transmits the large message mode CPM message to the non-CPM system of an unavailable CPM system recipient, and then the non-CPM system forwards the message to the recipient, thus solving the problem existing in the related technologies that a large message mode CPM message cannot be transmitted to an unavailable user and consequentially improving user experience.

DETAILED DESCRIPTION

As a large message mode CPM message occupies a large space and therefore cannot be directly included within an SIP message, and the transmission mode of a large message mode CPM message is different from that of a pager-mode CPM message, for the transmission path of the large message mode CPM message is divided into a signaling path and a media path, that is, signaling is transmitted via the signaling path and media is transmitted via the media path, Therefore, in embodiments of the disclosure, if a recipient is an unavailable user when a large message mode CPM message is being transmitted, Media negotiations are carried out firstly between a CPM client of a sender and an IWF by using a session invitation message (e.g. "INVITE") of the large message mode CPM message and a corresponding response message, then a Message Session Relay Protocol (MSRP) link is established between the CPM client of the sender and the IWF based on the negotiated media path parameters, the CPM client of the sender transmits the message body (i.e. the contents of the CPM message) of the large message mode CPM message to the IWF through the established MSRP link, the IWF converts the contents of the large message mode CPM message according to a non-CPM system protocol and then sends the converted contents to the non-CPM system of the recipient, and the non-CPM system transmits the large message mode CPM message to the client of the recipient.

The embodiments of the disclosure and the features thereof can be combined with each other when no conflict is caused.

The preferred embodiments of the disclosure are illustrated below in combination with accompanying drawings, and it should be appreciated that the preferred embodiments herein are only for illustrating and explaining the disclosure but not for limiting the disclosure.

In embodiments of the disclosure, an SIP/IP core network function node, through which a signaling transmission is actually achieved between each two function entities shown in the figures, is elided in FIG. 1A to FIG. 9, and this eliding is not to be construed as limitation to the disclosure.

According to an embodiment of the disclosure, there is provided a method for transmitting a large message mode CPM message to an unavailable CPM system user.

Figure 1A:
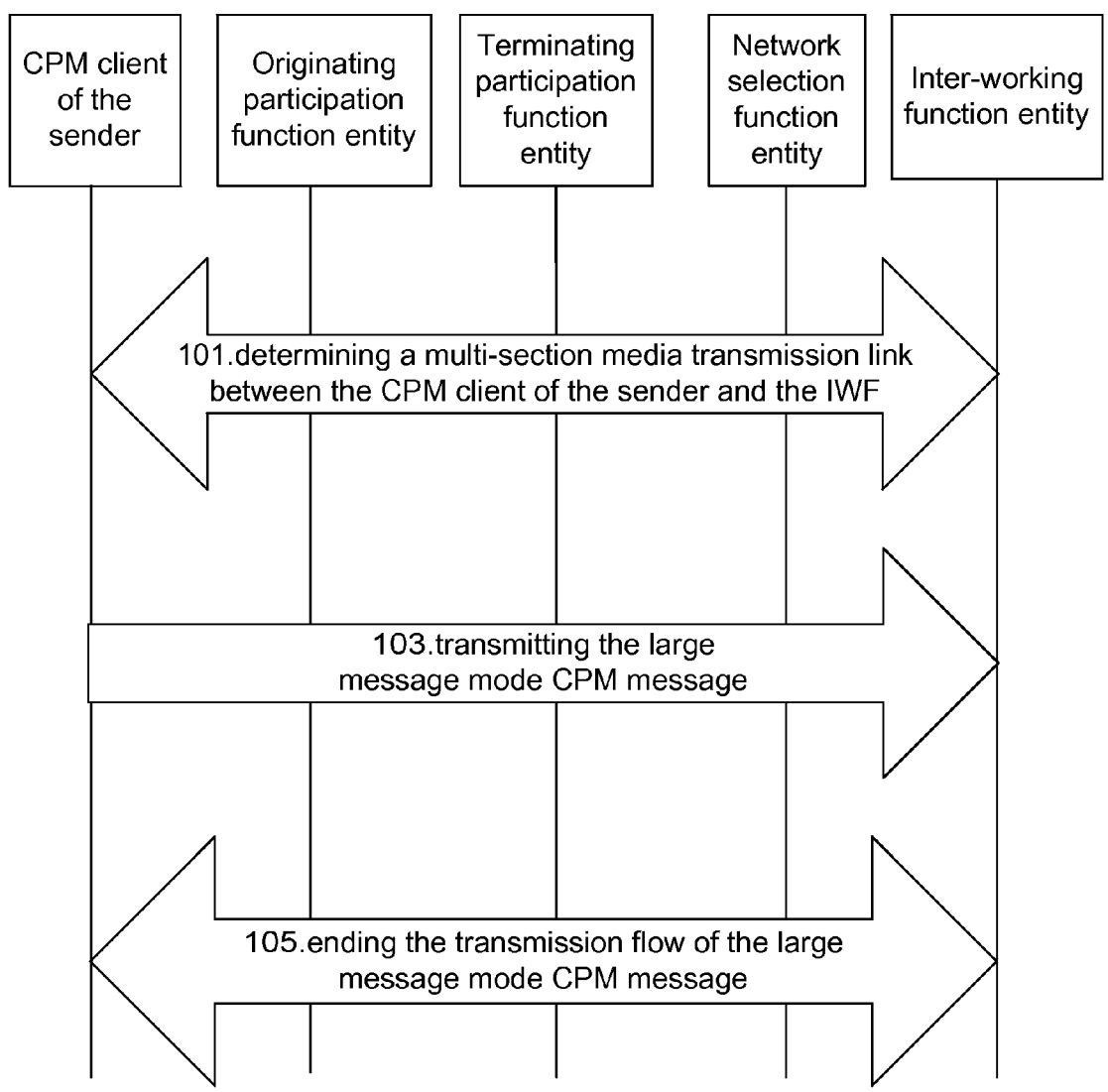
FIG. 1A is a flow chart of a method for transmitting a large message mode CPM message according to an embodiment of the disclosure.
Figure 1B:
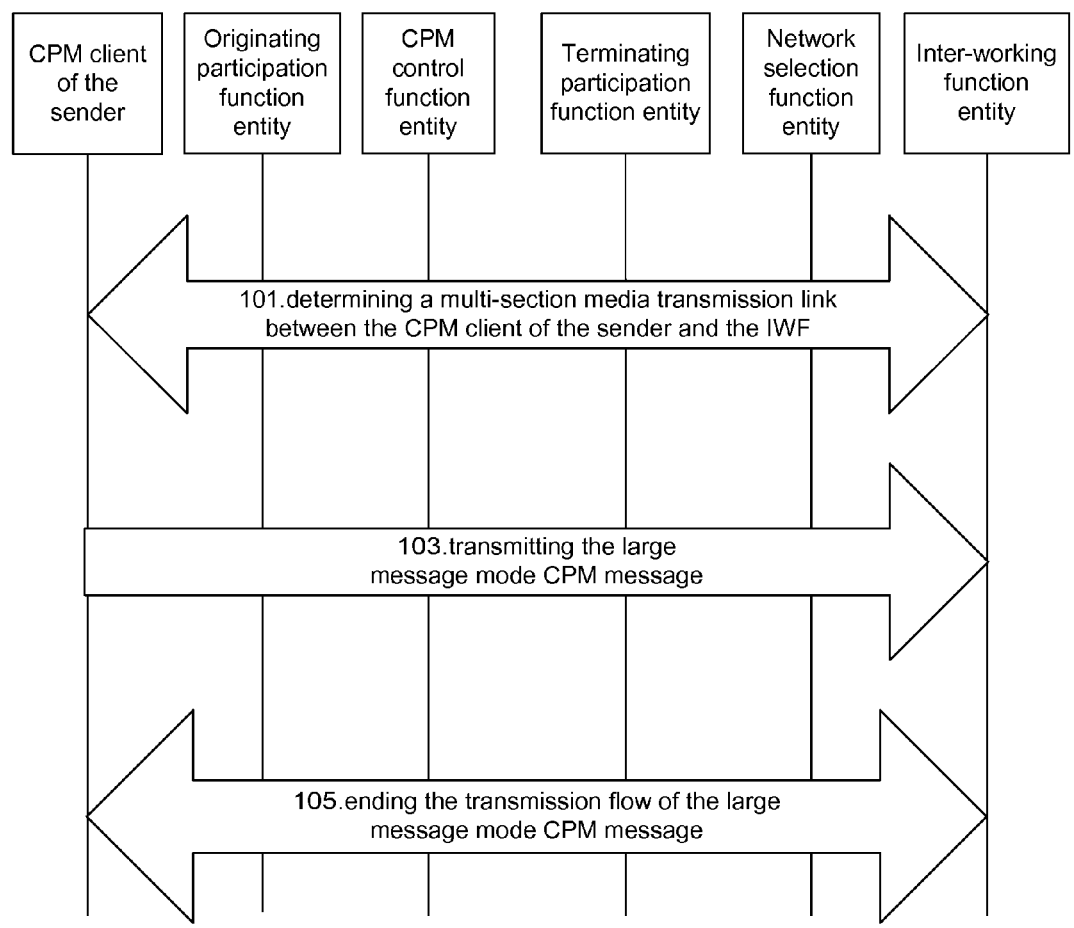
FIG. 1B is a flow chart of another method for transmitting a large message mode CPM message according to an embodiment of the disclosure.

FIG. 1A and FIG. 1B are flow charts of a method for transmitting a large message mode CPM message according to an embodiment of the disclosure, as shown in FIG. 1A and FIG. 1B, in this embodiment, for an unavailable CPM system recipient, the method for transmitting a large message mode CPM message mainly comprises the following steps (steps S101-S105):

Step S101: a CPM client of a sender sends the session invitation message of a large message mode CPM message, carries out, based on the session invitation message, media negotiations with an IWF through an originating participation function entity (that is, a participation function entity to which the sender belongs), or a CPM control function entity, a terminating participation function entity and a network selection function entity to determine a multi-section media transmission link between the CPM client of a sender and the IWF.

No CPM control function entity is involved in this step when the large message mode CPM message is transmitted to a single unavailable user, as shown in FIG. 1A, and a CPM control function entity is involved in this step when the large message mode CPM message is transmitted to a group, as shown in FIG. 1B.

Step S103: the CPM client of the sender sends the large message mode CPM message to the IWF through the multi-section media transmission link established in the aforementioned step, and the IWF transmits the received message to the non-CPM system of the recipient.

And step S105: the CPM client of the sender or IWF initiates to end the transmission flow of the large message mode CPM message.

In accordance with the solution provided in this embodiment, if a recipient is an unavailable user when a CPM user transmits a large message mode CPM message to another CPM user (i.e. the recipient), the network entities participating in the transmission of the large message mode CPM message consist of the CPM client of the sender, the originating participation function entity, the terminating participation function entity, a network selection function entity, a network inter-working function entity and a non-CPM system. Media negotiations are carried out among the CPM client of the sender, the originating participation function entity, the terminating participation function entity, the network selection function entity and the network inter-working function entity through a session invitation message and a success response message; based on the media negotiation, a first MSRP link is established between the CPM client of the sender and the originating participation function entity, a second MSRP link is established between the originating participation function entity and the terminating participation function entity, and a third MSRP link is established between the terminating participation function entity and the inter-working function entity, and then, the CPM client of the sender transmits the large message mode CPM message to the inter-working function entity through each segment of MSRP links, and the inter-working function entity transmits the large message mode CPM message to the non-CPM system, and the non-CPM system transmits the large message mode CPM message to the unavailable CPM system recipient.

Specifically, the process of media negotiations may comprise the following process: the CPM client of the sender sends a first session invitation message which is then routed to the originating participation function entity via an SIP/IP core network; the originating participation function entity generates and sends a second session invitation message which is then routed to the terminating participation function entity via the SIP/IP core network; the terminating participation function entity generates and sends a third session invitation message which is then routed to the network selection function entity via the SIP/IP core network; the network selection function entity selects the inter-working function entity according to the third session invitation message and sends a fourth session invitation message which is then routed to the inter-working function entity via the SIP/IP core network; the inter-working function entity generates and sends a fourth success response message which is then routed to the network selection function entity via the SIP/IP core network; the network selection function entity sends a third success response message which is then routed to the terminating participation function entity via the SIP/IP core network; the terminating participation function entity generates and sends a second success response message which is then routed to the originating participation function entity via the SIP/IP core network; and the originating participation function entity generates and sends a first success response message which is then routed to the CPM client of the sender via the SIP/IP core network.

In accordance with the solution provided in this embodiment, when a CPM user transmits a large message mode CPM message to an unavailable CPM system recipient in a target group, the network entities participating in the transmission of the large message mode CPM message consist of the CPM client of the sender, the originating participation function entity, a CPM control function entity, the terminating participation function entity, a network selection function entity, a network inter-working function entity and a non-CPM system. Media negotiations are carried out among the CPM client of the sender, the originating participation function entity, the terminating participation function entity, the network selection function entity and the network inter-working function entity through a session invitation message and a success response message; based on the media negotiation, a first MSRP link is established between the CPM client of the sender and the originating participation function entity, a second MSRP link is established between the originating participation function entity and the CPM control function entity, a third MSRP link is established between the CPM control function entity and the terminating participation function entity, and a fourth MSRP link is established between the terminating participation function entity and the inter-working function entity, and then, the CPM client of the sender transmits the large message mode CPM message to the inter-working function entity through the MSRP links, and the inter-working function entity transmits the large message mode CPM message to the non-CPM system, and at last, the non-CPM system transmits the large message mode CPM message to the unavailable CPM system recipient.

Specifically, the process of media negotiations may comprise the following process: the CPM client of the sender sends a first session invitation message which is then routed to the originating participation function entity via an SIP/IP core network; the originating participation function entity generates and sends a second session invitation message which is then routed to the CPM control function entity via the SIP/IP core network; the CPM control function entity generates and sends a third session invitation message which is then routed to the terminating participation function entity via the SIP/IP core network; the terminating participation function entity generates and sends a fourth session invitation message which is then routed to the network selection function entity via the SIP/IP core network; the network selection function entity selects the inter-working function entity according to the fourth session invitation message and sends a fifth session invitation message which is then routed to the inter-working function entity via the SIP/IP core network; the inter-working function entity generates and sends a fifth success response message which is then routed to the network selection function entity via the SIP/IP core network; the network selection function entity sends a fourth success response message which is then routed to the terminating participation function entity via the SIP/IP core network; the terminating participation function entity generates and sends a third success response message which is then routed to the CPM control function entity via the SIP/IP core network; the CPM control function entity generates and sends a second success response message which is then routed to the originating participation function entity via the SIP/IP core network; and the originating participation function entity generates and sends a first success response message which is then routed to the CPM client of the sender via the SIP/IP core network.

In this embodiment, each segment of the MSRP links among the CPM client of the sender and the inter-working function entity are established in the following three ways: (1) a MSRP link is established by an originating party of the session invitation message initiatively; (2) a MSRP link is established by the CPM client of the sender initiatively; and (3) a MSRP link is established by the CPM client of the sender initiatively and a MSRP link is established by the inter-working function entity initiatively.

By taking the transmission of a large message mode CPM message to a single unavailable CPM system user and the transmission of a large message mode CPM message to a target group as examples, the method for transmitting a large message mode CPM message provided in the embodiment of the disclosure is described below, and the three MSRP link establishment modes are also explained below with reference to specific embodiments. In the accompanying drawings of the following embodiments, the arrow direction of each segment of MSRP link indicates a direction from the establisher to the entity at the opposite end.

In the following embodiments 1, 2 and 3, the CPM client of the sender transmits a large message mode CPM message to a single unavailable CPM system user (that is, a one-to-one large message mode CPM message transmission mode), without loss of generality, and it is assumed that the CPM client of the sender is a CPM Client A with effective bounding address CPM Address A, the sender belongs to a participation function entity A (i.e. an originating participation function entity), the recipient belongs to a participation function entity B (i.e. a terminating participation function entity), a network selection function entity is an Inter-working Selection Function Entity B (ISF B), the inter-working function entity selected by the network selection function entity is an IWF B, and the selected non-CPM system is a non-CPM system B (i.e. an SMS or MMS system selected by an ISF).

Embodiment 1

In this embodiment, each segment of MSRP link between a CPM Client A and an IWF B is established in Way 1, that is, the MSRP links are established by the originating party of a session invitation message initiatively.

Figure 2:
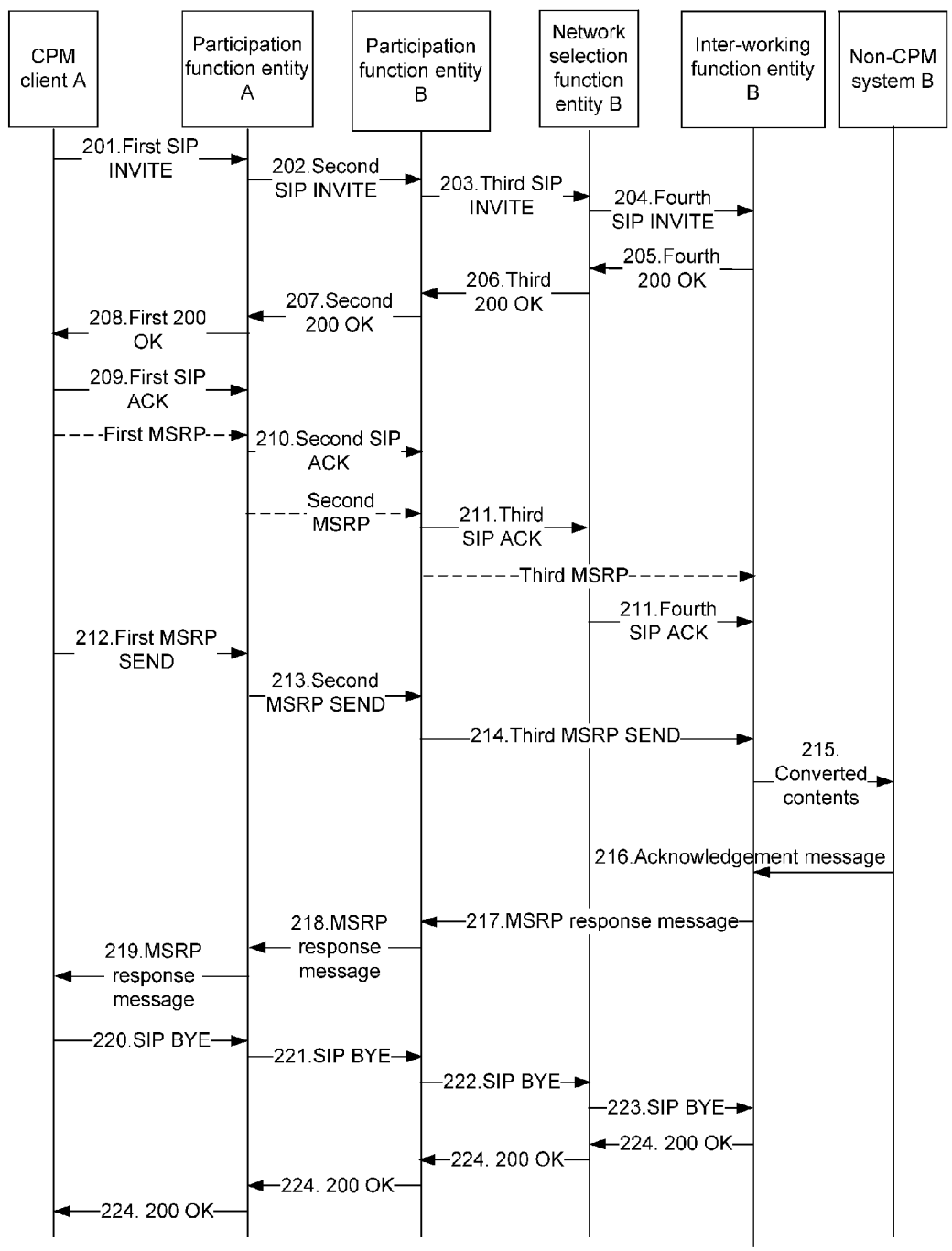
FIG. 2 is a flow chart of an implementation mode of Embodiment 1.

FIG. 2 is a flow chart of the implementation mode of this embodiment, as shown in FIG. 2, in this embodiment, the transmission of a large message mode CPM message from the CPM client of the sender to an unavailable CPM system recipient mainly comprises the following steps:

Step S201: the CPM Client A sends a first SIP INVITE (i.e. an invitation message) of the large message mode CPM message to a CPM user B, wherein the SDP message for a session negotiation is included in the first SIP INVITE which is routed to the participation function entity A via an SIP/IP core network.

Step S202: the participation function entity A receives the first SIP INVITE, and processes the received message as a Back-To-Back User Agent (B2BUA), i.e. generates and sends a second SIP INVITE; the second SIP INVITE including an SDP message for a session negotiation is routed to a participation function entity B via the SIP/IP core network.

Step S203: the participation function entity B receives the second SIP INVITE, and processes the received message as a B2BUA, i.e. generates and sends a third SIP INVITE; the third SIP INVITE, in which an SDP message for a session negotiation is included, is routed to a network selection function entity B via the SIP/IP core network.

Step S204: the network selection function entity B receives the third SIP INVITE, selects an inter-working function entity which is assumed to be an inter-working function entity B according to the parameter information in the message, such as content type, size and so on, and then sends a fourth SIP INVITE in which the SDP message included in the third SIP INVITE is remained; the fourth SIP INVITE is routed to the inter-working function entity B via the SIP/IP core network.

The network selection function entity may be an SIP gateway which forwards the received SIP message, in this case, the fourth SIP INVITE message is identical to the third SIP INVITE message in essence.

Step S205: the inter-working function entity B receives the fourth SIP INVITE, and generates and sends a fourth 200 OK (i.e. a fourth success response message) which is routed to the network selection function entity B via the SIP/IP core network, and in which an SDP message for a session negotiation response is included.

The MSRP connection parameters of the inter-working function entity B may be included in the SDP message in the fourth 200 OK; moreover, the inter-working function entity B may be taken as an SIP User Agent Server (UAS).

Step S206: the network selection function entity B receives the fourth 200 OK and sends a third 200 OK, wherein the third 200 OK is routed to the participation function entity B via the SIP/IP core network, and the SDP message included in the fourth 200 OK is remained in the third 200 OK.

The network selection function entity may be an SIP gateway which forwards the received SIP message, in this case, the fourth 200 OK message is identical to the third 200 OK message in essence.

Step S207: the participation function entity B receives the third 200 OK, processes the received message as a B2BUA, and generates and sends a second SIP 200 OK; the second SIP 200 OK, in which an SDP message for a session negotiation is included, is routed to the participation function entity A via the SIP/IP core network.

The MSRP connection parameters of the participation function entity B are included in the second SIP 200 OK, wherein the MSRP connection parameters may be included by but are not limited to be included by the SDP message.

Step S208: the participation function entity A receives the second 200 OK, processes the received message as a B2BUA, and generates and sends a first SIP 200 OK; the first SIP 200 OK, in which an SDP message for a session negotiation is included, is routed to the CPM Client A via the SIP/IP core network.

The MSRP connection parameters of the participation function entity A are included in the first SIP 200 OK, wherein the MSRP connection parameters may be included by but are not limited to be included by the SDP message.

Step S209: the CPM Client A receives the first SIP 200 OK, then, the SDP media parameter negotiation for the transmission of the large message mode CPM message is completed; the CPM Client A sends a first SIP ACK (i.e. acknowledgement) message which is then routed to the participation function entity A via the SIP/IP core network.

In this step, the CPM Client A may establish a first MSRP link to the participation function entity A according to the result obtained from a negotiation based on the first 200 OK and the MSRP information (e.g. MSRP connection parameters) in the first SIP 200 OK by initiatively initiating a link establishment request according to the MSRP connection parameters or by selecting an existing MSRP link with a matched host, port and/or MSRP Universal Resource Identifier (URI) as the this segment of MSRP link. Then, step S212 is executed to initiate a first MSRP SEND (i.e. a media transmission request) to transmit the large message mode CPM message, wherein the first MSRP SEND is the MSRP SEND between the CPM Client A and the participation function entity A.

Step S210: after receiving the first SIP ACK, the participation function entity A sends a second SIP ACK message which is then routed to the participation function entity B via the SIP/IP core network, and establishes, on the other hand, a second MSRP link to the participation function entity B according to the MSRP connection parameters of the participation function entity B, and continues to execute step S213 based on the second MSRP link to relay the media data in the received first MSRP SEND through the second MSRP SEND, that is, to transmit the second MSRP SEND, wherein the second MSRP SEND is the MSRP SEND between the participation function entity A and the participation function entity B.

The second MSRP link may be established in the following way: the participation function entity A initiatively initiates a link establishment request according to the MSRP connection parameters or selects an existing MSRP link with a matched host, port and/or MSRP URI as the second MSRP link; the MSRP connection parameters of the participation function entity B may be obtained from the MSRP path information of the second SIP 200 OK or the path head information of the first MSRP SEND.

In this step, the second SIP ACK message may be a message that is newly created by the participation function entity A or the directly-forwarded first SIP ACK message, and no related limitation is given herein.

Step S211 after receiving the second SIP ACK, the participation function entity B sends a third SIP ACK message which is routed to the network selection function entity B via the SIP/IP core network, and then, the network selection function entity B sends a fourth SIP ACK message to the IWF B; on the other hand, the participation function entity B further establishes a third MSRP link to the CPM Client B according to the MSRP connection parameters of the IWF B, and continues to execute Step S213 based on the third MSRP link to relay the media data in the received second MSRP SEND through a third MSRP SEND, that is, to transmit the third MSRP SEND, wherein the third MSRP SEND is the MSRP SEND between the participation function entity B and the IWF B.

The network selection function entity may be an SIP gateway which forwards the received SIP message, in this case, the fourth ACK message is identical to the third ACK message in essence.

The third MSRP link may be established in the following way: the participation function entity B initiatively initiates a link establishment request according to the MSRP connection parameters or selects an existing MSRP link with a matched host, port and/or MSRP URI as the second MSRP link; the MSRP connection parameters of the IWF B may be obtained from the MSRP path information of the third SIP 200 OK or the path head information of the second MSRP SEND.

The third SIP ACK message may be a message that is newly created by the participation function entity B or the directly-forwarded second SIP ACK message, no related limitation is given herein.

Steps S212-S214: the MSRP SEND is transmitted to the IWF B based on each segment of established MSRP link, and the IWF B receives the large message mode CPM message.

Step S215: after receiving all the contents of the large message mode CPM message sent by the participation function entity B, an inter-working function entity B performs a protocol conversion on the received contents to convert the received contents to a contents meeting a protocol format of a non-CPM system B and then sends the converted contents meeting the protocol format to the non-CPM system B.

Step S216: the non-CPM system B receives the contents that is subjected to the protocol conversion and sent by the inter-working function entity B and returns a reception acknowledgement message to the inter-working function entity B.

Step S217: the inter-working function entity B receives the acknowledgement message from the non-CPM system B, performs a protocol conversion on the acknowledgement message to generate an MSRP response message, and then sends the generated MSRP response message, wherein the generated MSRP response message is routed to the participation function entity B via the third MSRP link.

Step S218: the participation function entity B receives and sends the MSRP response message to the participation function entity A via the second MSRP link.

Step S219: the participation function entity A sends and receives the MSRP response message to the CPM Client A via the first MSRP link.

Step S220: after all the contents of the large message mode CPM message is transmitted, or after the MSRP response message of the last MSRP SEND is received, the CPM Client A sends a SIP BYE (i.e. a session completion message) indicative of the completion of the session of the large message mode CPM message, wherein the SIP BYE is routed to the participation function entity A via the SIP/IP core network.

Step S221: after receiving the SIP BYE, the participation function entity A sends a session completion message which is then routed to the participation function entity B via the SIP/IP core network.

Step S222: after receiving the SIP BYE, the participation function entity B sends the received SIP BYE which is then routed to the network selection function entity B via the SIP/IP core network.

Step S223: after receiving the SIP BYE, the network selection function entity B sends the received the SIP BYE which is then routed to the inter-working function entity B via the SIP/IP core network.

And step S224: after receiving the SIP BYE, the inter-working function entity B sends a response message (i.e. 200 OK) of the session completion message, wherein the response message is finally routed to the CPM Client A through the network selection function entity B, the participation function entity B and the participation function entity A.

Or, in the above-described steps S220-S224, after all the contents of the large message mode CPM message is transmitted, the inter-working function entity B receives an acknowledgement message and then sends a session completion message; after receiving the session completion message, the participation function entity B sends the received session completion message; after receiving the session completion message, the participation function entity A sends the received session completion message which is routed to the CPM Client A via the SIP/IP core network; the CPM Client A receives the session completion message and then sends a response message (i.e. 200 OK); and the response message passes through the participation function entity A, the participation function entity B and the network selection function entity B and is routed to the inter-working function entity B at last.

In FIG. 2, the participation function entity A sends a second SIP ACK after receiving the first SIP ACK, however, it should be appreciated that the actual situation is not limited to this, and that in a specific implementation process, the participation function entity A may send a second SIP ACK after receiving the second 200 OK, without waiting to receive the first SIP ACK, and similarly, the participation function entity B may send a third SIP ACK after receiving the third 200 OK, without waiting to receive the second SIP ACK.

In this embodiment, the SIP ACK message sent by each network function entity (e.g. the participation function entity A and the participation function entity B), may be a message that is newly created by the participation function entity or the directly-forwarded SIP ACK message, no related limitation is given herein.

In FIG. 2, the CPM Client A establishes the first MSRP link after receiving the first 200 OK, the participation function entity establishes the second MSRP link after receiving the first SIP ACK, and the participation function entity B establishes the third MSRP link after receiving the second SIP ACK. It should be additionally noted that the participation function entity A may establish the second MSRP link after receiving the second 200 OK, and the participation function entity B may establish the third MSRP link after receiving the third 200 OK.

Additionally, in this embodiment, the participation function entity A may establish the second MSRP link according to the MSRP connection parameters of the participation function entity B after receiving the first MSRP SEND, wherein the MSRP connection parameters of the participation function entity B may be obtained from the second 200 OK or the path head information of the first MSRP SEND; and the participation function entity B may establish the third MSRP link according to the MSRP connection parameters of the IWF B after receiving the second MSRP SEND, wherein the MSRP connection parameters of the IWF B may be obtained from the third 200 OK or the path head information of the second MSRP SEND.

Embodiment 2

In this embodiment, each segment of MSRP link between a CPM Client A and an IWF B is established in Way 2, that is, the MSRP links are established by the recipient of the session invitation message initiatively.

In this embodiment, the media negotiations among the CPM Client A, a participation function entity A, a participation function entity B, a network selection function entity B and the IWF B are the same as that described in Embodiment 1, that is, a session invitation message, a 200 OK message and an SIP ACK message are sent in the way described in Embodiment 1. Additionally, in this embodiment, MSRP links and messages MSRP SEND are transmitted in the way described in Embodiment 1, therefore, no repeated description is given here.

Figure 3:
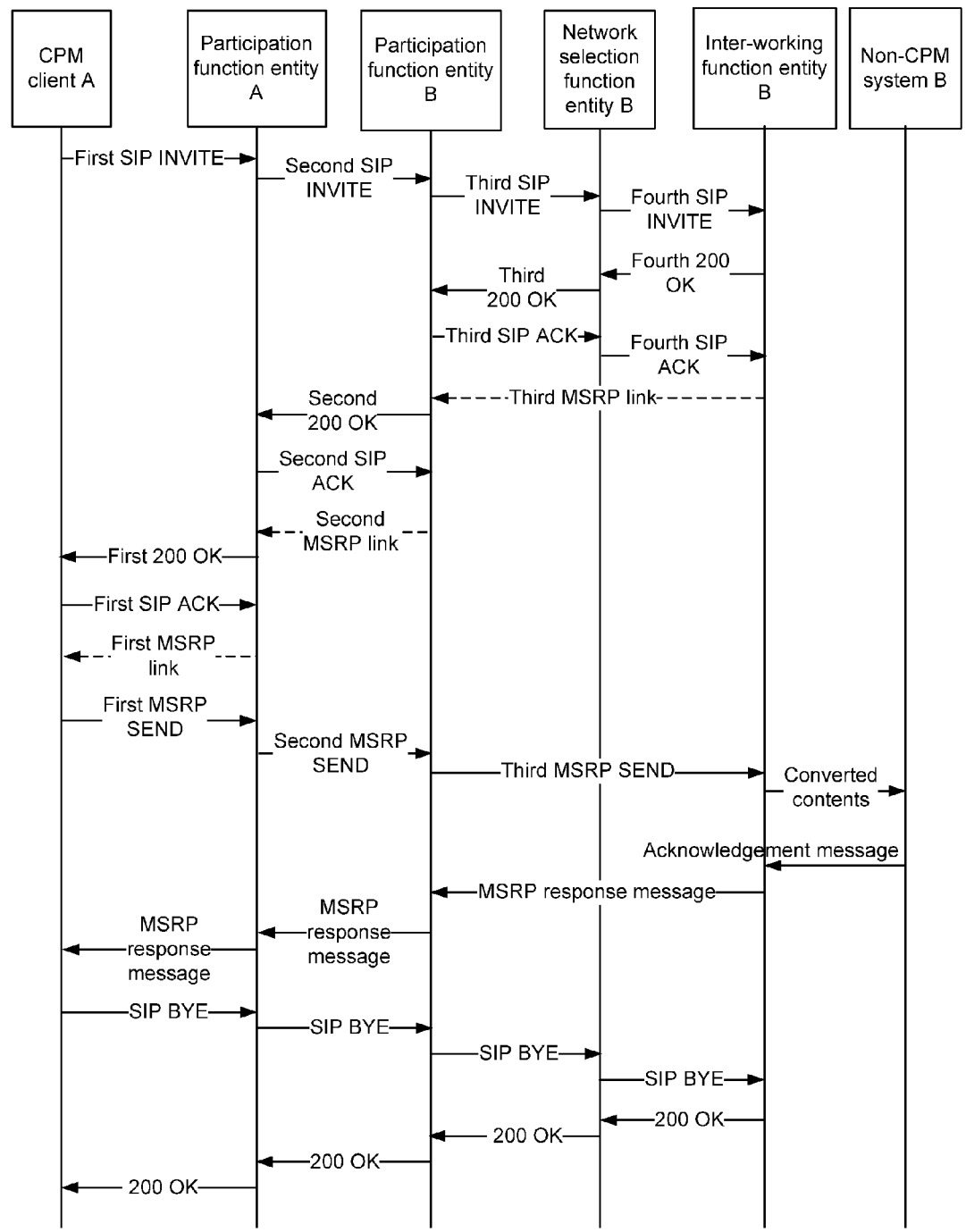
FIG. 3 is a flow chart of an implementation mode of Embodiment 2.

The difference of this embodiment from Embodiment 1 lies in the establisher and establishment time of each segment of MSRP link. FIG. 3 is a flow chart of an implementation mode of this embodiment, and this embodiment is described below with reference to FIG. 3.

In this embodiment, the establisher of an MSRP link is the recipient of a session invitation message, as shown in FIG. 3, the establisher of a first MSRP link is the participation function entity A, the establisher of a second MSRP link is the participation function entity B, and the establisher of a third MSRP link is an inter-working function entity A; the MSRP connection parameters of the CPM Client A are included in a first SIP INVITE, the MSRP connection parameters of the participation function entity A are included in a second SIP INVITE, and the MSRP connection parameters of the participation function entity B are included in a third SIP INVITE and a fourth SIP INVITE. Moreover, as shown in FIG. 3, in this embodiment, the participation function entity A establishes a first MSRP link according to the MSRP connection parameters of the CPM Client A after receiving a first SIP ACK message; the participation function entity B establishes a second MSRP link according to the MSRP connection parameters of the participation function entity A after receiving a second SIP ACK message; and the inter-working function entity establishes a third MSRP link according to the MSRP connection parameters of the participation function entity B after receiving a fourth SIP ACK message.

In FIG. 3, the participation function entity A sends a second SIP ACK after receiving the second 200 OK, and the participation function entity B sends a third SIP ACK after receiving the third 200 OK, however, it should be appreciated that the actual situation is not limited to this, and that in a specific implementation process, the participation function entity A may send a second SIP ACK after receiving the first SIP ACK, and similarly, the participation function entity B may send a third SIP ACK after receiving the second SIP ACK.

Embodiment 3

In this embodiment, each segment of MSRP link between a CPM Client A and an IWF B are established in Way 3, that is, the MSRP links are respectively established by the CPM Client A and the IWF B initiatively.

Figure 4:
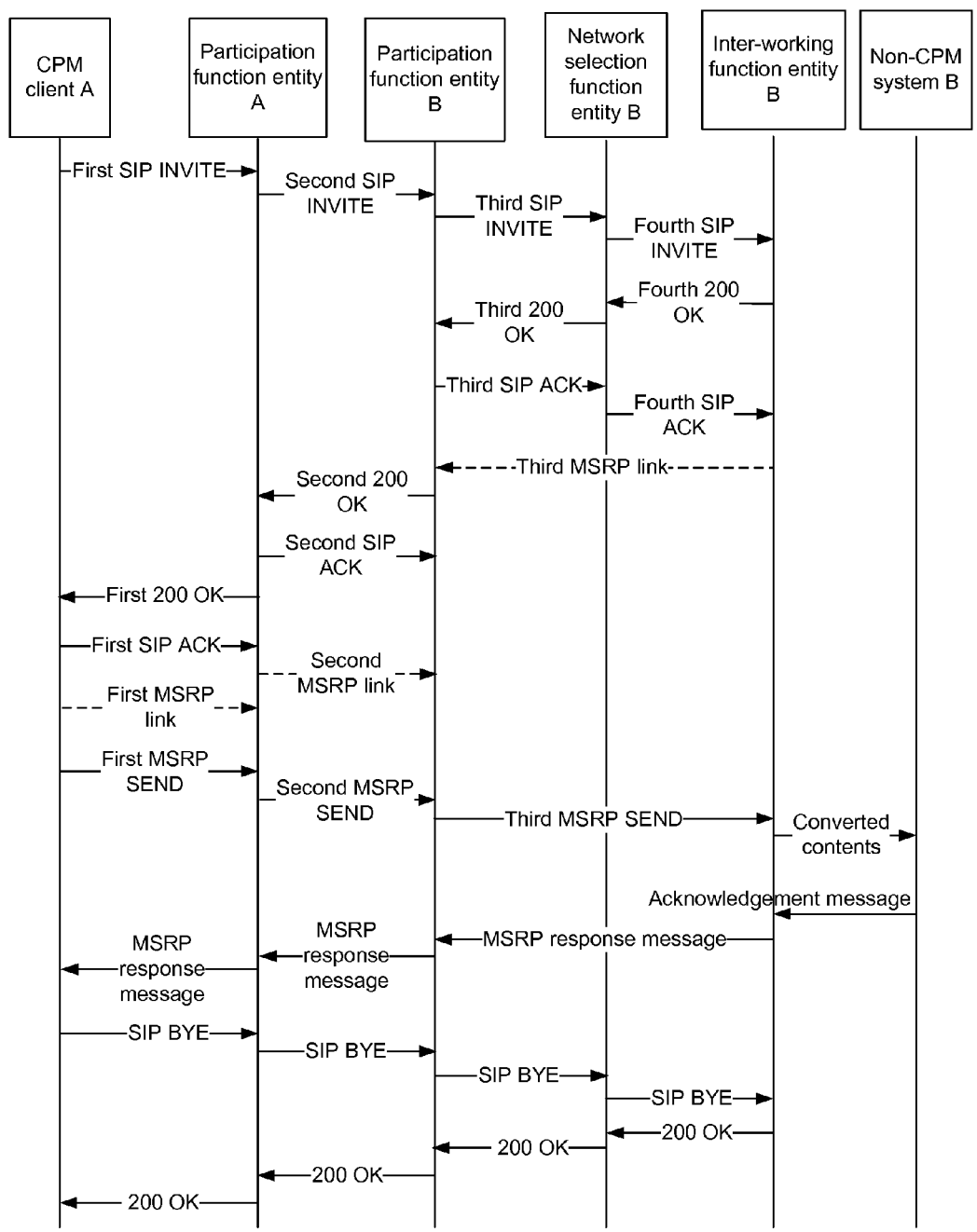
FIG. 4 is a flow chart of an implementation mode of Embodiment 3.

FIG. 4 is a schematic diagram illustrating the flow of a method for transmitting a large message mode CPM message according to this embodiment. As shown in FIG. 4, in this embodiment, the media negotiations among a participation function entity A, a participation function entity B, a network selection function entity B and the IWF B are the same as that described in Embodiment 1, that is, a session invitation message, a 200 OK message and an SIP ACK message are sent in the way described in Embodiment 1. Additionally, in this embodiment, MSRP links and messages MSRP SEND are transmitted in the way described in Embodiment 1, therefore, no repeated description is given here.

The difference of this embodiment from Embodiment 1 lies in that: a first MSRP link is established by the CPM Client A and a third MSRP link is established by the IWF B. Specifically, after receiving a first 200 OK message, the CPM client initiatively establishes a first MSRP link according to the MSRP connection parameters of the participation function entity A which are included in the first 200 OK; and after receiving a fourth SIP ACK message, the IWF B initiatively establishes a third MSRP link according to the MSRP connection parameters of the participation function entity B which are included in the fourth SIP INVITE message.

Moreover, in this embodiment, the MSRP connection parameters of the participation function entity B are included in the third SIP INVITE message sent by the participation function entity B and the fourth SIP INVITE sent by the network selection function entity B, and the MSRP connection parameters of the participation function entity A are included in the first 200 OK message sent by the participation function entity A.

In this embodiment, the second MSRP link may be established by the participation function entity A or the participation function entity B. As shown in FIG. 4, the second MSRP link is established by the participation function entity A in FIG. 4; the participation function entity A establishes the second MSRP link after receiving the first SIP ACK; it should be additionally noted that the participation function entity A may establish the second MSRP link after receiving the second 200 OK message, and in this case, the MSRP connection parameters of the participation function entity B are included in the second 200 OK message sent by the participation function entity B.

Additionally, the second MSRP link may further be established by the participation function entity B, and in this case, the MSRP connection parameters of the participation function entity A are included in the second SIP INVITE message sent by the participation function entity A. Specifically, the participation function entity B may establish the second MSRP link according to the MSRP connection parameters of the participation function entity A included in the second SIP INVITE after receiving the second SIP ACK message.

Figure 5:
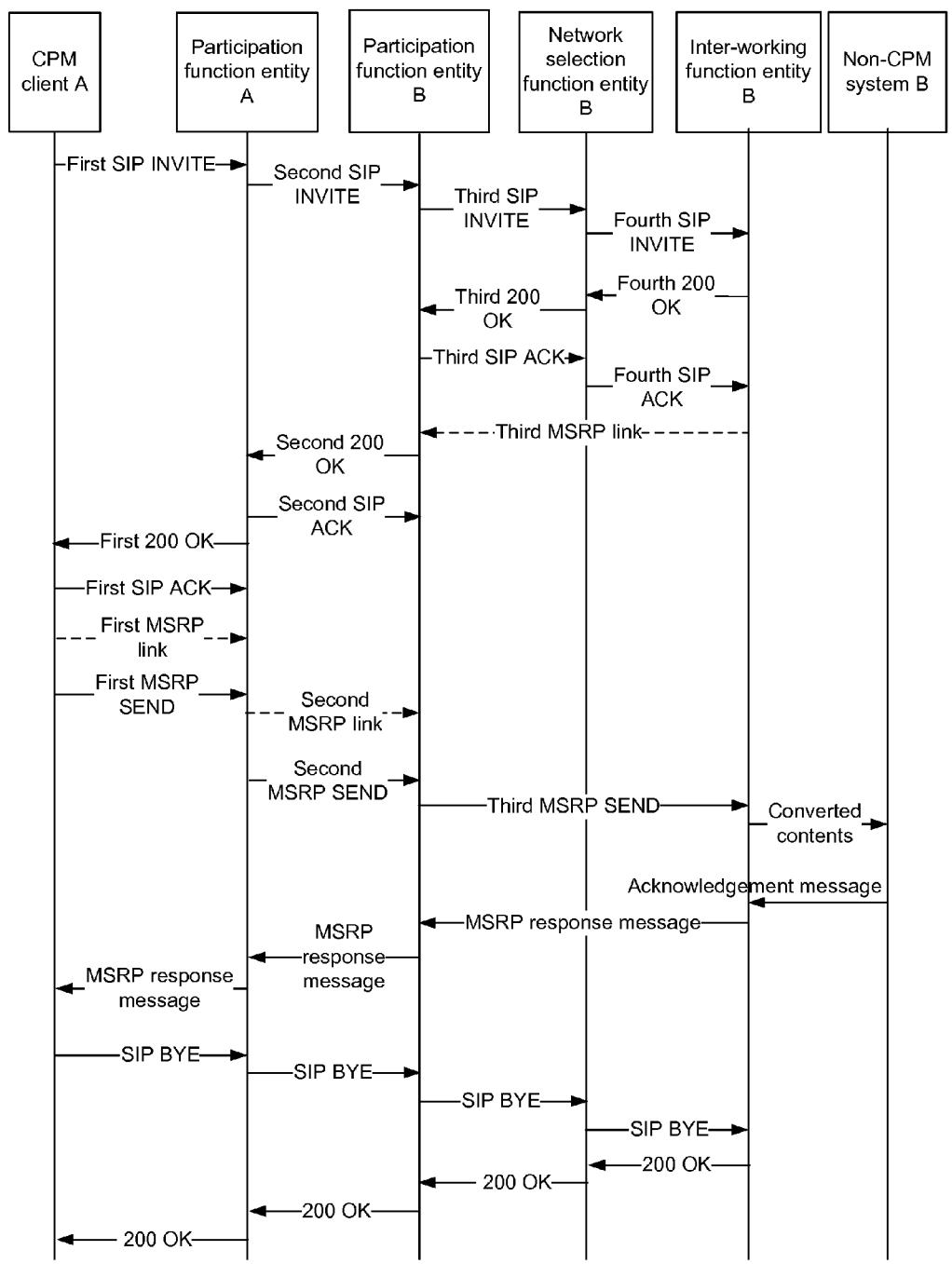
FIG. 5 is a flow chart of another implementation mode of Embodiment 3.

Additionally, this embodiment may be implemented in another way which is shown in FIG. 5 and different from the implementation mode shown in FIG. 4 for the participation function entity A establishes the second MSRP link after receiving the first MSRP SEND. Specifically, as shown in FIG. 5, after receiving a first 200 OK message, the CPM client initiatively establishes a first MSRP link according to the MSRP connection parameters of the participation function entity A which are included in the first 200 OK message and then sends a first MSRP SEND, after receiving the first MSRP SEND, the participation function entity A establishes a second MSRP link according to MSRP connection parameters of the participation function entity B, wherein the MSRP connection parameters of the participation function entity B are obtained from a second success response message or the path head information of the first MSRP SEND; a third MSRP link is still established by the IWF B initiatively according to the MSRP connection parameters of the participation function entity B which are included in the fourth SIP INVITE message after the participation function entity B receives the fourth SIP INVITE message.

In this embodiment, once the transmission of the MSRP media data is completed, the inter-working function entity B returns an MSRP response message to the participation function entity B along a media transmission path, or returns an MSRP response message to the participation function entity B after receiving an acknowledgement message from the non-CPM system, as stated in the embodiments above.

The processing conducted by the participation function entity A and the participation function entity B on the received message further comprises: assigning values and the like to the fields (e.g. "Contact", "Allow" and the like) of the message head of the newly-generated SIP 200 OK message, however, it should be appreciated that the disclosure is not relied on the processing.

The following Embodiments 4, 5 and 6 are described by taking the transmission of a large message mode CPM message from a CPM client of a sender to a target group as an example, wherein an unavailable CPM system user is included in the target group. In the following embodiments, the CPM client of the sender is a CPM Client A, the originating participation function entity to which the sender belongs is a Participation function A, the CPM control function entity of the target group is a CPM Control Function X, the terminating participation function entity to which the recipient of the target group belongs is a Participation function B, the network selection function entity is an Inter-working Selection Function B (ISF B), the inter-working function entity is an Inter-Working Function B (IWF B), the selected non-CPM system is a non-CPM System B (i.e. an SMS or MMS system selected through an ISF).

Embodiment 4

In this embodiment, each segment of MSRP link between a CPM Client A and an IWF B is established in Way 1, that is, the MSRP link is established by an originating party of a session invitation message initiatively, and a large message mode CPM message is transmitted to an unavailable CPM system recipient in a target group via the established MSRP links.

Figure 6:
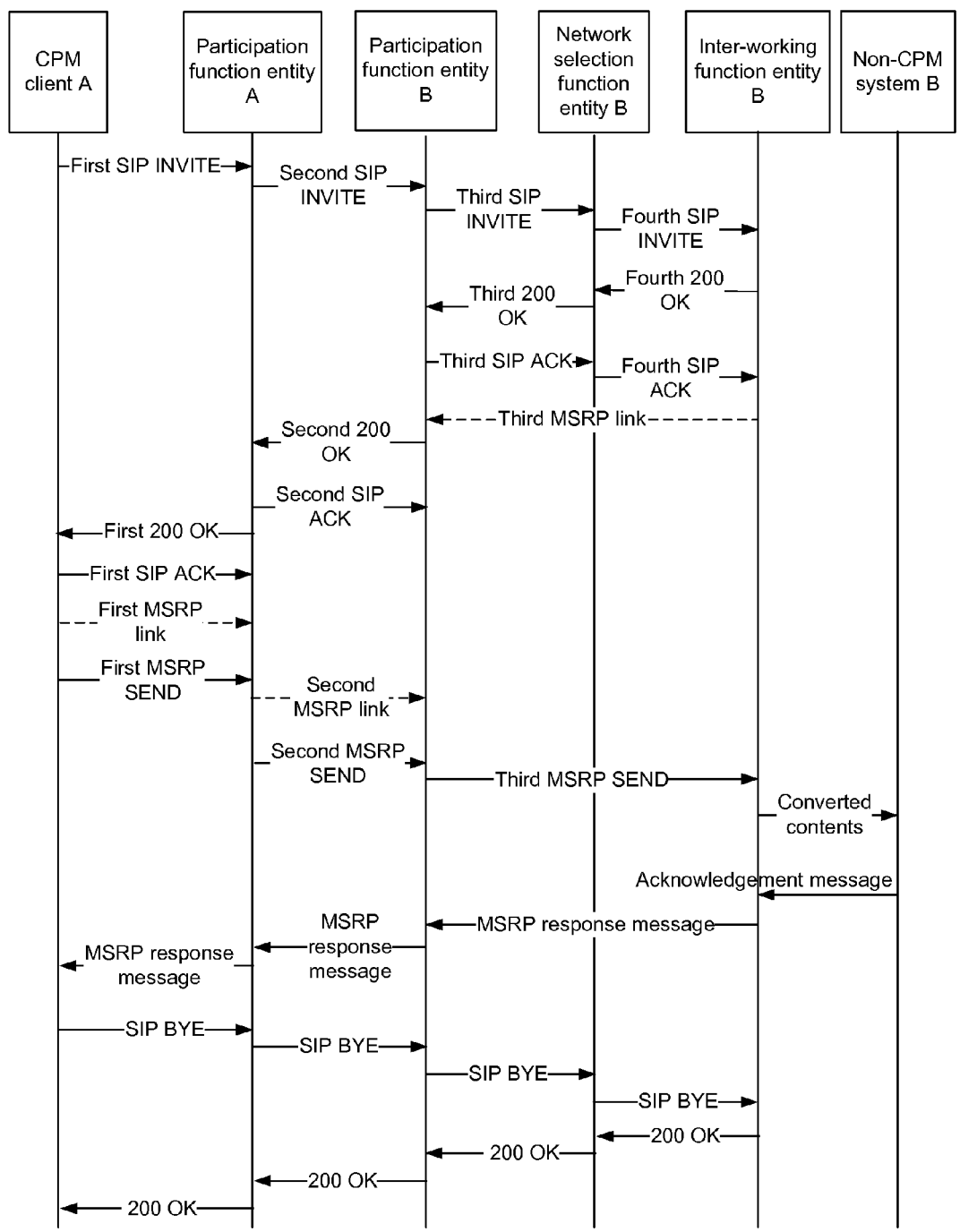
FIG. 6 is a flow chart of an implementation mode of Embodiment 4.

FIG. 6 is a flow chart of the implementation mode of this embodiment, as shown in FIG. 6, in this embodiment, the transmission of a large message mode CPM message mainly comprises the following steps:

Step S601: a CPM Client A sends a first SIP INVITE (i.e. an invitation message) of a large message mode CPM message to the group, wherein an SDP message for a session negotiation is included in the SIP INVITE, and the size, content type of the information of media data to be transmitted are included in the SDP message, and the first SIP INVITE is routed to the participation function entity A via an SIP/IP core network.

The MSRP connection parameters of the CPM Client A may be included in the SDP message in the first SIP INVITE.

The target group to which the CPM Client A sends the large message mode CPM message may be a temporary group (e.g. Ad-hoc group) or a pre-defined group, when the target group is an Ad-hoc group, the list information of each recipient in the target group is included in the first SIP INVITE sent by the CPM client A of the sender, and when the target group is a pre-defined group, the value of the head field "request-URI" of the first SIP INVITE sent by the CPM client A of the sender is the address of the pre-defined group.

Step S602: the participation function entity A receives the first SIP INVITE, and processes the received message as a Back-To-Back User Agent (B2BUA), i.e. generates and sends a second SIP INVITE in which an SDP message for a session negotiation is included, wherein the size and content type information included in the first SIP INVITE are remained in the SDP message, and the second SIP INVITE is routed to the CPM control function entity X via the SIP/IP core network.

The MSRP connection parameters of the participation function entity A may be included in the SDP message in the second SIP INVITE.

When being included in the first SIP INVITE, the list information of each recipient in the Ad-hoc group is remained in the second SIP INVITE, and when the value of the head field "request-URI" of the first SIP INVITE is the address of the pre-defined group, the address of the pre-defined group is remained in this value.

Step S603: the CPM control function entity X receives the second SIP INVITE, and processes, for a user in a CPM system, the received message as a B2BUA, i.e. generates and sends a third SIP INVITE in which an SDP for a session negotiation is included, wherein the third SIP INVITE is routed to the participation function entity B via an SIP/IP core network.

The MSRP connection parameters of the CPM control function entity X may be included in the SDP message in the third SIP INVITE.

Step S604: the participation function entity B receives the fourth SIP INVITE, and processes the received message as a B2BUA, i.e. generates and sends a fourth SIP INVITE in which an SDP message for a session negotiation is included, wherein the fourth SIP INVITE is routed to the participation function entity B via the SIP/IP core network.

Step S605: the network selection function entity B receives the fourth SIP INVITE, selects an inter-working function entity which is assumed to be an inter-working function entity B according to the parameter information in the message, such as content type, size and so on, and then sends a fifth SIP INVITE in which the SDP message included in the fourth SIP INVITE is remained, wherein the fifth SIP INVITE is routed to the inter-working function entity B via the SIP/IP core network.

The network selection function entity may be an SIP gateway which forwards the received SIP message, in this case, the fifth SIP INVITE message is identical to the fourth SIP INVITE message in essence.

Step S606: the inter-working function entity B receives the fifth SIP INVITE, and generates and sends a fifth 200 OK (i.e. a success response message) which is routed to the network selection function entity B via the SIP/IP core network, and in which an SDP message for a session negotiation response is included.

The MSRP connection parameters of the inter-working function entity B may be included in the SDP message in the fifth 200 OK.

The signaling plane function of the inter-working function entity B may be taken as an SIP User Agent Server (UAS).

Step S607: the network selection function entity B receives the fifth 200 OK and sends a fourth 200 OK, wherein the fourth 200 OK is routed to the participation function entity B via the SIP/IP core network, and the SDP message included in the fifth 200 OK is remained in the fourth 200 OK.

The network selection function entity may be an SIP gateway which forwards the received SIP message, in this case, the fifth 200 OK message is identical to the fourth 200 OK message in essence.

Step S608: the participation function entity B receives the fourth 200 OK, and processes the received message as a B2BUA, i.e. generates and sends a third 200 OK (e.g. a success response message), wherein the third 200 OK is routed to the CPM control function entity X via the SIP/IP core network.

The MSRP connection parameters of the participation function entity B may be included in the SDP message in the third 200 OK.

The participation function entity B may establish a fourth MSRP link to the inter-working function entity B according to the MSRP connection parameters of the inter-working function entity B.

Step S609: the CPM control function entity X receives the third 200 OK, and processes the received message as a B2BUA, i.e. generates and sends a second 200 OK; wherein the second 200 OK, in which an SDP message for a session negotiation is included, is routed to the participation function entity A via the SIP/IP core network.

The MSRP connection parameters of the CPM control function entity X may be included in the SDP message in the second 200 OK.

In this step, the CPM control function entity may generate and send a second 200 OK after receiving the first 200 OK message from a target terminal, wherein the first 200 OK message from the target terminal may be sent from the network selection function entity B, that is, a non-CPM system, or from another terminating participation function entity, that is, a recipient in a CPM system in the group.

In this step, the CPM control function entity X may establish a third MSRP link to the participation function entity B according to the MSRP connection parameters of the participation function entity B.

Step S610: the participation function entity A receives the second 200 OK, and processes the received message as a B2BUA, i.e. generates and sends a first 200 OK; wherein the first 200 OK, in which an SDP message for a session negotiation is included, is routed to the CPM Client A via the SIP/IP core network.

The MSRP connection parameters of the participation function entity A may be included in the SDP message in the first 200 OK.

In this step, the participation function entity A may establish a second MSRP link to the CPM control function entity X according to the MSRP connection parameters of the CPM control function entity X.

Step S611: after receiving the first 200 OK, the CPM Client A sends a first SIP ACK (i.e. acknowledgement) message which is then routed to the participation function entity A via the SIP/IP core network.

In this step, the CPM Client A may establish a first MSRP link to the participation function entity A according to the MSRP connection parameters of the participation function entity A.

Step S612: after receiving the first SIP ACK, the participation function entity A sends a second SIP ACK message which is then routed to the CPM control function entity X via the SIP/IP core network.

In this step, the participation function entity A may establish a second MSRP link to the CPM control function entity X according to the MSRP connection parameters of the CPM control function entity X.

Step S613: after receiving the second SIP ACK, the CPM control function entity X sends a third SIP ACK message which is then routed to the participation function entity B via the SIP/IP core network.

In this step, the CPM control function entity X may establish a third MSRP link to the participation function entity B according to the MSRP connection parameters of the participation function entity B.

Step S614: after receiving the third SIP ACK, the participation function entity B sends a fourth SIP ACK which is then routed to the participation function entity B via the SIP/IP core network.

In this step, the participation function entity B may establish a fourth MSRP link to the inter-working function entity according to the MSRP connection parameters of the inter-working function entity B.

Step S615: after receiving the fourth SIP ACK, the network selection function entity B sends a fifth SIP ACK message which is then routed to the inter-working function entity B via the SIP/IP core network.

The network selection function entity may be an SIP gateway which forwards the received SIP message, in this case, the fifth ACK message is identical to the fourth ACK message in essence.

Step S616: the CPM client A sends a first MSRP SEND (i.e. a media transmission request) via the first MSRP link, wherein the first MSRP SEND is an MSRP SEND between the CPM Client A and the participation function entity A.

This step may be executed once the first MSRP link is established.

Step S617: the participation function entity A relays the media data in the received first MSRP SEND via the second MSRP link, that is, sends a second MSRP SEND which refers to an MSRP SEND between the participation function entity A and the CPM control function entity X.

Step S618: the CPM control function entity X relays the media data in the received second MSRP SEND via the third MSRP link, that is, sends a third MSRP SEND which refers to an MSRP SEND between the CPM control function entity X and the participation function entity B.

In this step, the media data received by the CPM control function entity through the second MSRP link is relayed to each group in the group via the established MSRP links connected with the control function entity.

Step S619: the participation function entity B relays the media data in the received third MSRP SEND via the fourth MSRP link, that is, sends a fourth MSRP SEND which refers to an MSRP SEND between the participation function entity B and the inter-working function entity B.

Step S620: after receiving all the contents of the large message mode CPM message sent by the participation function entity B, the inter-working function entity B performs a protocol conversion on the received contents to convert the received contents to a contents meeting a protocol format of the non-CPM system B and then sends the converted contents meeting the protocol format to the non-CPM system B.

Step S621: the non-CPM system B receives the contents that is subjected to the protocol conversion and sent by the inter-working function entity B and returns a reception acknowledgement message to the inter-working function entity B.

Step S622: the inter-working function entity B receives an acknowledgement message from the non-CPM system B, performs a protocol conversion on the received acknowledgement message to generate an MSRP response message, and then sends the generated MSRP response message, wherein the generated MSRP response message is routed to the participation function entity B via the fourth MSRP link.

Step S623: the participation function entity B receives and sends the MSRP response message to the participation function entity A via the third MSRP link.

Step S624: the CPM control function entity X receives the MSRP response message and sends the received MSRP response message to the participation function entity A via the second MSRP link.

Step S625: the participation function entity A sends the received MSRP response message to the CPM Client A via the first MSRP link.

Step S626: after all the contents of the large message mode CPM message is transmitted, or after the MSRP response message of the last MSRP SEND is received, the CPM Client A sends a SIP BYE (a session completion message) indicative of the completion of the large message mode CPM message, wherein the SIP BYE is routed to the participation function entity A via the SIP/IP core network.

Step S627: the participation function entity A receives and sends the SIP BYE which is then routed to the CPM control function entity X via the SIP/IP core network.

Step S628: the CPM control function entity X receives and sends the SIP BYE to each recipient in the group, wherein the SIP BYE is routed to the participation function entity B via the SIP/IP core network.

Step S629: the participation function entity B receives and sends the SIP BYE, wherein for an unavailable CPM system recipient, the SIP BYE is routed to the inter-working function entity B via the network selection function entity B.

And step S630: after receiving the SIP BYE, the inter-working function entity B sends a response message (i.e. 200 OK) of the SIP BYE, wherein the response message is finally routed to the CPM Client A through the network selection function entity B, the participation function entity B, the CPM control function entity X and the participation function entity A.

Or in the above-described steps S626-S630, after all the contents of the large message mode CPM message is transmitted, the inter-working function entity B sends a session completion message which is transmitted to the participation function entity B via the network selection function entity B, then, sequentially, the participation function entity B receives and sends the session completion message; the CPM control function entity X receives and sends the session completion message; the participation function entity A receives and sends the session completion message, and the session completion message is finally routed to the CPM Client A via the SIP/IP core network.

In FIG. 6, during the process of media negotiations, each network function entity (e.g. the participation function entity A, the CPM control function entity X, the participation function entity B) sends an SIP ACK to the target terminal after receiving the SIP ACK from the source terminal, and like the situation in Embodiment 1, each network function entity may directly send an SIP ACK to the target terminal after receiving the 200 OK, without waiting to receive an SIP ACK from the source terminal, that is, the participation function entity A may send a second SIP ACK after receiving the second 200 OK, without waiting to receive the first SIP ACK; the control function entity X may send a third SIP ACK after receiving the third 200 OK, without waiting to receive the second SIP ACK; and the participation function entity B may send a fourth SIP ACK after receiving the fourth 200 OK, without waiting to receive the third SIP ACK.

Additionally, in this embodiment, the SIP ACK message sent by each network function entity (e.g. the participation function entity A, the CPM control function entity X and the participation function entity B) may be a message that is newly created by the participation function entity or the directly-forwarded SIP ACK message, no related limitation is given herein.

In FIG. 6, after receiving the first 200 OK, the CPM Client A establishes the first MSRP link according to the MSRP connection parameters of the participation function entity A which are included in the first 200 OK, and the other network function entities (including the participation function entity A, the CPM control function entity X and the participation function entity B) establish MSRP links after receiving an SIP ACK from the source terminal. It should be additionally noted that the participation function entity A may establish the second MSRP link after receiving an MSRP SEND request message from the CPM Client A or a success response message from the control function entity X. This supplementation is also suitable for the participation function entity B, so no more repeated description is given herein. Besides, this supplementation is further suitable for the establishment of the third and fourth MSRP links. It also should be noted that the second and fourth MSRP links are triggered based on the same triggering time, for example, the triggering time is the time of receiving an ACK or an MSRP SEND or a 200 OK. The third MSRP link established by control function entities initiatively is triggered based on a triggering time different from that of the MSRP links established by the participation function entities, that is, the third MSRP link may be triggered when an ACK is received from the source terminal, or a 200 OK is received, or an MSRP SEND request is received.

Embodiment 5

In this embodiment, each segment of MSRP link between a CPM Client A and an IWF B is established in Way 2, that is, the MSRP link is established by the recipient of the session invitation message initiatively, and a large message mode CPM message is transmitted to an unavailable CPM system recipient in a target group via the established MSRP links.

Figure 7:
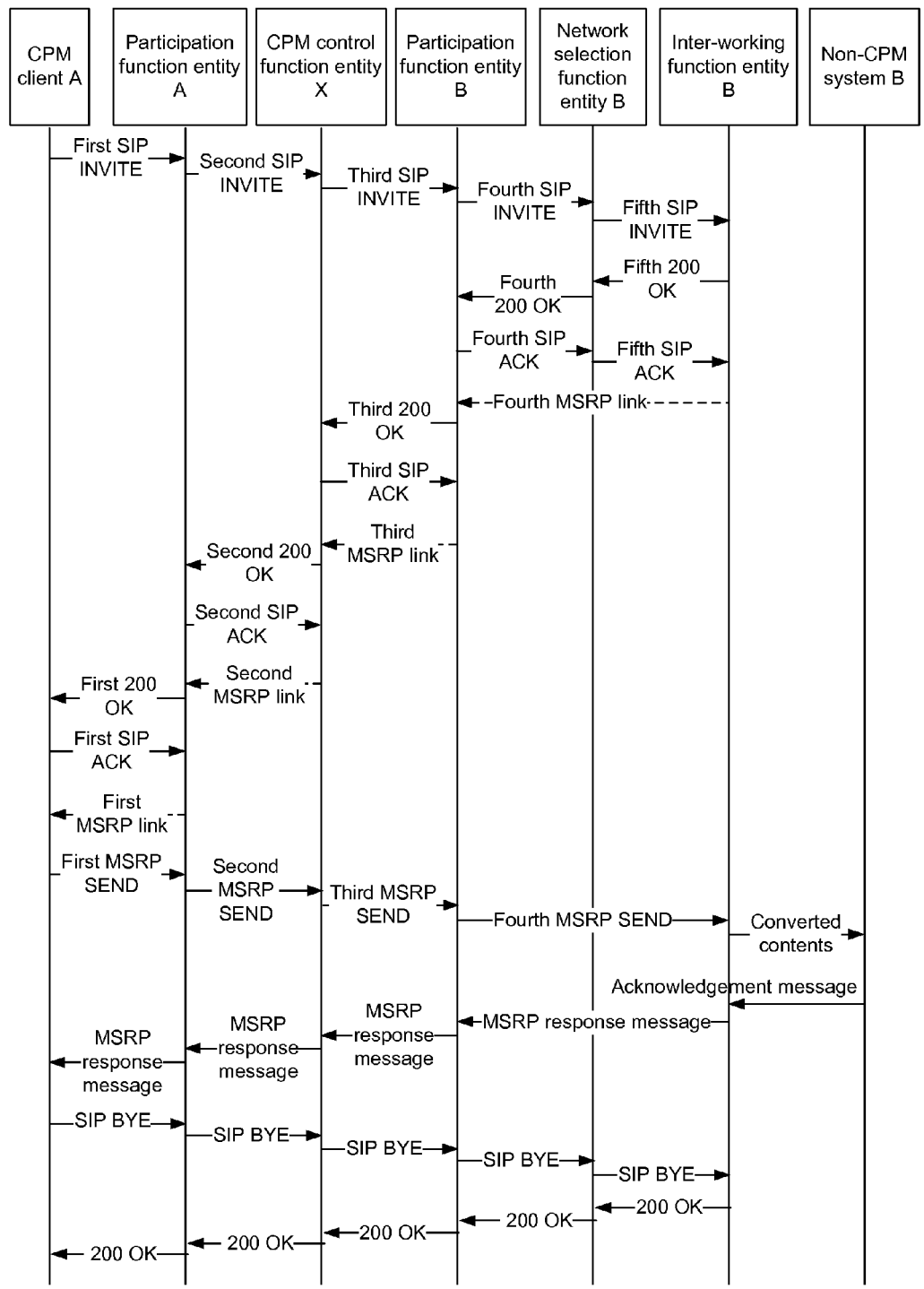
FIG. 7 is a flow chart of an implementation mode of Embodiment 5.

FIG. 7 is a flow chart of an implementation mode of this embodiment, as shown in FIG. 7, in this embodiment, the media negotiations among the CPM Client A, a participation function entity A, a CPM control function entity X, a participation function entity B, a network selection function entity B and the IWF B are the same as that described in Embodiment 4, that is, a session invitation message, a 200 OK message and an SIP ACK message are sent in the way described in Embodiment 4. Moreover, in this embodiment, MSRP links and messages MSRP SEND are transmitted in the way described in Embodiment 4, therefore, no repeated description is given here.

The difference of this embodiment from Embodiment 4 lies in the establisher and establishment time of each segment of MSRP link, moreover, in this embodiment, the originating party of each session invitation make the MSRP connection parameters thereof be included in the initiated session invitation message; this embodiment is described below with reference to FIG. 7.

As shown in FIG. 7, during the process of media negotiations of this embodiment, the MSRP connection parameters of the CPM Client A are included in the first SIP INVITE which is sent by the CPM Client A and routed to the participation function entity A via an SIP/IP core network; the MSRP connection parameters of the participation function entity A are included in the second SIP INVITE which is sent by the participation function entity A and routed to the control function entity X via the SIP/IP core network; the MSRP connection parameters of the control function entity X are included in the third SIP INVITE which is sent by the control function entity X and routed to the participation function entity B via the SIP/IP core network; the MSRP connection parameters of the participation function entity B are included in the fourth SIP INVITE which is sent by the participation function entity B and routed to the network selection function entity B via the SIP/IP core network; and the MSRP connection parameters of the network selection function entity B are included in the fifth SIP INVITE which is sent by the network selection function entity B and routed to the IWF B via the SIP/IP core network As shown in FIG. 7, after receiving the SIP ACK message which is sent by the participation function entity B and forwarded by the network selection function entity, the IWF B initiatively establishes a fourth MSRP link between the CPM client B and the participation function entity B according to the MSRP connection parameters of the participation function entity B obtained during the process of media negotiations. After receiving a third SIP ACK message from the control function entity X, the participation function entity B initiatively establishes a third MSRP link between the participation function entity B and the control function entity X according to the MSRP connection parameters of the control function entity X obtained during the process of media negotiations. After receiving a second SIP ACK from the participation function entity A, the control function entity X initiatively establishes a second MSRP link between the control function entity X and the participation function entity A according to the MSRP connection parameter information of the participation function entity A obtained during the process of media negotiations. After receiving a first SIP ACK from the CPM Client A, the participation function entity A initiatively establishes a first MSRP link the participation function entity A and the CPM client according to the MSRP connection parameter information of the CPM Client A obtained during the process of media negotiations.

Embodiment 6

In this embodiment, each segment of MSRP link between a CPM Client A and an IWF B is established in Way 3, that is, the MSRP link is respectively established by the CPM Client A and the IWF B initiatively. And a large message mode CPM message is transmitted to an unavailable CPM recipient in a target group based on the established MSRP links.

Figure 8:
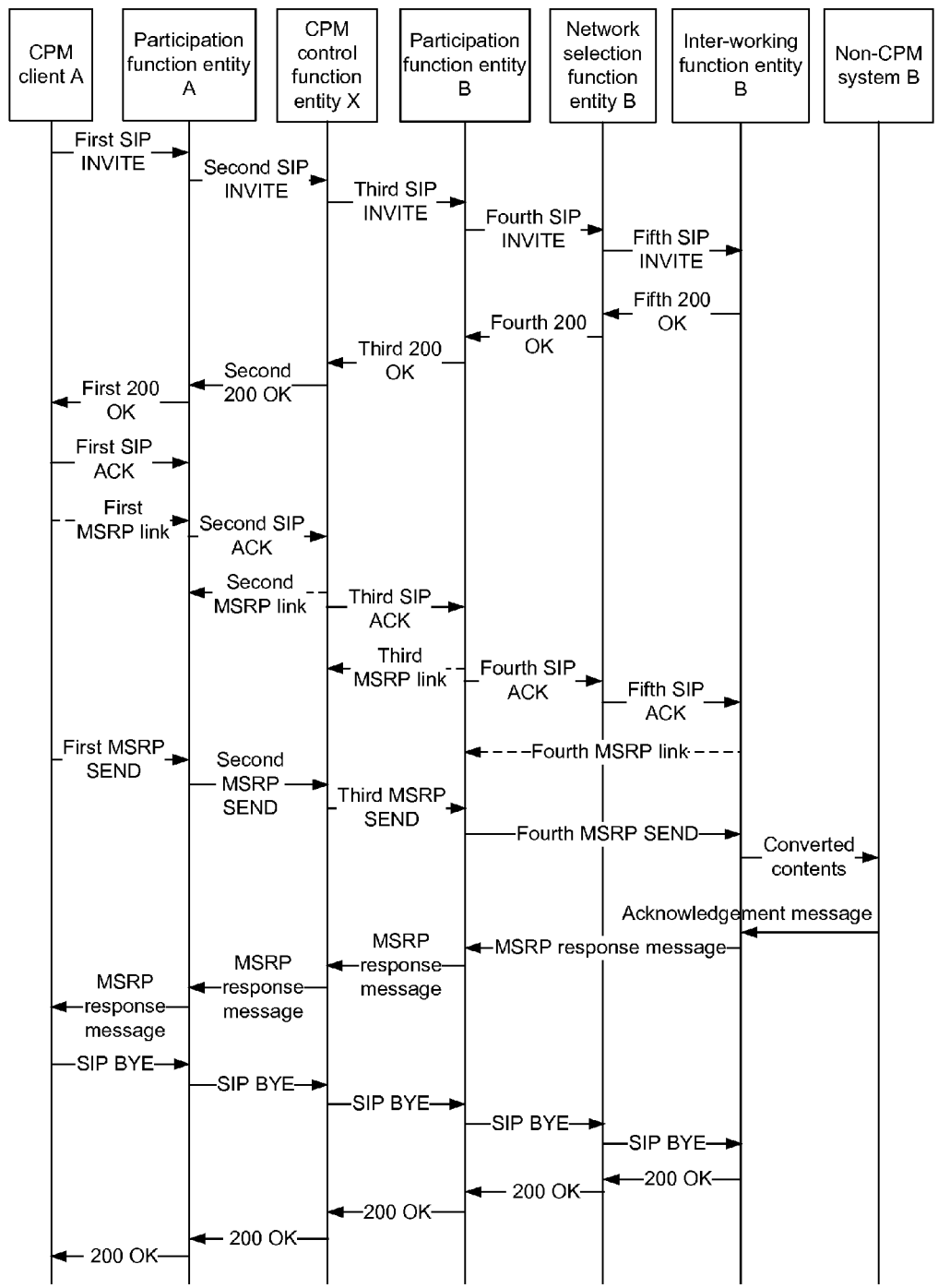
FIG. 8 is a flow chart of an implementation mode of Embodiment 6.

FIG. 8 is a flow chart of an implementation mode of this embodiment, as shown in FIG. 8, the media negotiations of this embodiment are substantially identical to those of Embodiment 4, the difference of this embodiment from Embodiment 4 lies in that during the process of media negotiations, the MSRP connection parameters of the participation function entity B are included in the fourth SIP INVITE sent by the participation function entity B and the fifth SIP INVITE sent by the network selection function entity; the MSRP connection parameters of the participation function entity A are included in the first success response message sent by the participation function entity A; the MSRP connection parameters of the participation function entity A are included in the second SIP INVITE message sent by the participation function entity A, or the MSRP connection parameters of the CPM control function entity X are included in the second success response message sent by the CPM control function entity X; and the MSRP connection parameters of the CPM control function entity X are included in the third SIP INVITE message sent by the CPM control function entity X, or the MSRP connection parameters of the participation function entity B are included in the third success response message sent by the participation function entity B.

Additionally, this embodiment is also different from Embodiment 4 in the establisher and the establishment time of each segment of MSRP link; in FIG. 8, after receiving the first 200 OK, the CPM client of the sender establishes a first MSRP link to the participation function entity A according to the MSRP connection parameters of the participation function entity A; after receiving the fifth SIP ACK, the IWF B establishes a fourth MSRP link to the participation function B according to the MSRP connection parameters of the participation function entity B; after receiving the third SIP ACK, the participation function entity B establishes a third MSRP link to the CPM control function X according to the MSRP connection parameters of the CPM control function entity, in this case, the MSRP connection parameters of the CPM control function entity X are included in the third SIP INVITE sent by the CPM control function entity X; after receiving the second SIP ACK, the CPM control function entity X establishes a second MSRP link to the participation function entity A, in this case, the MSRP connection parameters of the participation function entity A are included in the second SIP INVITE sent by the participation function entity A. It should be additionally noted that the third MSRP link between the participation function entity B and the CPM control function entity X may be established by the CPM control function entity X, specifically, the CPM control function entity may establish the third MSRP link after receiving the fourth 200 OK or after receiving the second SIP ACK, in this case, the MSRP connection parameters of the participation function entity B are included in the third success response message sent by the participation function entity B; the second MSRP link between the CPM control function entity X and the participation function entity A may be established by the participation function entity A, specifically, the participation function entity A may establish the second MSRP link after receiving the first SIP ACK or the second 200 OK, in this case, the MSRP connection parameters of the CPM control function entity X are included in the second 200 OK sent by the CPM control function entity X.

In FIG. 8, during the process of media negotiations, each network function entity (e.g. the participation function entity A, the CPM control function entity X, the participation function entity B) directly sends an SIP ACK to the target terminal after receiving the 200 OK; it should be additionally noted that each network function entity may send an SIP ACK to the target terminal after receiving an SIP ACK from the source terminal, that is, the participation function entity A may send a second SIP ACK after receiving the first SIP ACK, the CPM control function entity X may send a third SIP ACK after receiving the second SIP ACK, and the participation function entity B may send a fourth SIP ACK after receiving the third SIP ACK.

Figure 9:
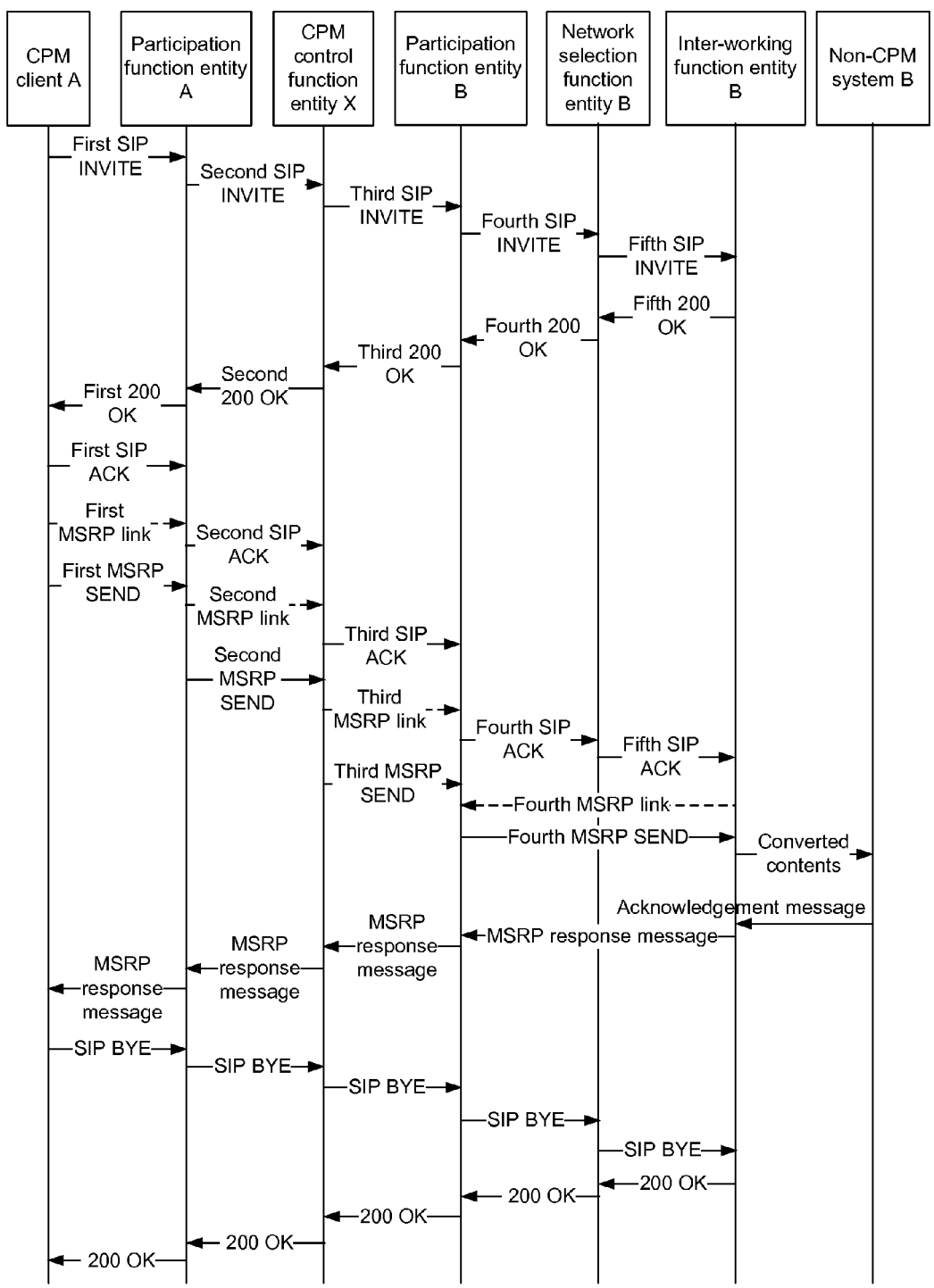
FIG. 9 is a flow chart of another implementation mode of Embodiment 6.

FIG. 9 is a flow chart of another implementation mode of the transmission of a large message mode CPM message according to this embodiment, in FIG. 9, the establisher and the establishment time of the first and fourth MSRP links are similar to those of the first and fourth MSRP links described in FIG. 8, the difference between FIG. 9 and FIG. 8 lies in that each network function entity (e.g. the participation function entity A, the CPM control function entity X and the participation function entity B) sends an SIP ACK after receiving the SIP ACK from the source terminal; moreover, in FIG. 9, the second MSRP link is established after the participation function entity A receives the first MSRP SEND, and the third MSRP link is established after the CPM control function entity receives the second MSRP SEND. Specifically, as shown in FIG. 11, the CPM Client A establishes a first MSRP link after receiving the first 200 OK and then sends a first MSRP SEND. After receiving the first MSRP SEND, the participation function entity A establishes a second MSRP link according to the MSRP connection parameters of the CPM control function entity X, wherein the MSRP connection parameters of the CPM control function entity X may be obtained from the second 200 OK or from the path head information of the first MSRP SEND; the participation function entity A sends a second MSRP SEND after establishing the second MSRP link; after receiving the second MSRP SEND, the CPM control function entity X establishes a third MSRP link according to the MSRP connection parameters of the participation function entity B; the MSRP connection parameters of the participation function entity B are obtained from the third 200 OK or from the path head information of the second MSRP SEND; and the inter-working function entity B establishes the fourth MSRP link after receiving the fifth SIP ACK.

In Embodiments 4, 5 and 6, the first, second, third and fourth MSRP links may be established in the following way: the establisher initiatively initiates a link establishment request according to the MSRP connection parameters of the opposite terminal or selects an existing MSRP link with a matched host, port and/or MSRP URI (Universal Resource Identifier) as this MSRP link.

In Embodiments 4, 5 and 6, once the transmission of the MSRP media data is completed, the inter-working function entity A may return an MSRP response message to the participation function entity B along a media transmission path, or, return an MSRP response message to the participation function entity B after receiving an acknowledgement message from the non-CPM system, as stated in this embodiment.

In the above-described Embodiments 1-6, the MSRP connection parameters refer to one of the following instances: URI parameter; IP address and port number; or, URI parameter, IP address and port number.

In accordance with an embodiment of the disclosure, there are further provided two systems for transmitting a large message mode CPM message, which are respectively configured to realize Embodiment 1 and Embodiment 2.

The first system for transmitting a large message mode CPM message provided in an embodiment of the disclosure comprises a CPM client of a sender, an originating participation function entity, a terminating participation function entity, an inter-working function entity and a non-CPM system, wherein Message Session Relay Protocol (MSRP) links are respectively established between the CPM client of the sender and the originating participation function entity, between the originating participation function entity and the terminating participation function entity, and between the terminating participation function entity and the inter-working function entity, wherein the establisher of each segment of MSRP link obtains the MSRP connection parameters of the opposite end through media negotiations and establishes the MSRP link according to the MSRP connection parameters; the CPM client of the sender is configured to send a large message mode CPM message to the inter-working function entity through each segment of established MSRP link in sequence; and the inter-working function entity is configured to perform a protocol conversion on the received contents of the large message mode CPM message and transmit the converted contents to the non-CPM system; and the non-CPM system is configured to send the message to an unavailable CPM system recipient at last.

Compared with the first system, the second system for transmitting a large message mode CPM message provided in an embodiment of the disclosure is additionally configured with a CPM control function entity, i.e., the second system for transmitting a large message mode CPM message comprises: a CPM client of a sender, an originating participation function entity, the CPM control function entity, a terminating participation function entity, an inter-working function entity and a non-CPM system, wherein Message Session Relay Protocol (MSRP) links are respectively established between the CPM client of the sender and the originating participation function entity, between the originating participation function entity and the CPM control function entity, between the CPM control function entity and the terminating participation function entity, and between the terminating participation function entity and the inter-working function entity, wherein the establisher of each segment of MSRP link obtains the MSRP connection parameters of the opposite end through media negotiations and establishes the MSRP link according to the MSRP connection parameters; the CPM client of the sender is configured to send the large message mode CPM message to the inter-working function entity through each segment of established MSRP link in sequence, the inter-working function entity is configured to perform a protocol conversion on the received contents of the large message mode CPM message and transmit the converted contents to the non-CPM system, and the non-CPM system is configured to send the message to an unavailable CPM system recipient at last.

It should be noted that in actual application, except for the aforementioned non-CPM system B, the clients and any two function entities of each entity are connected in any one of the following three ways:

Way 1: the connection between all the function entities is realized via an SIP/IP core network.

Way 2: the connection between part of the function entities is realized via an SIP/IP core network, and the other function entities except the part of the function entities are connected directly or via other forwarding devices except for the SIP/IP core network.

Way 3: all the function entities are connected directly or via other forwarding devices except for the SIP/IP core network.

It can be seen from the above that in the case where the aforementioned different connection ways are adopted, the clients except for the non-CPM system B and any two function entities of each entity can communicate with each other in any one of the following three manners:

Manner 1: the communication between all the function entities is realized via routing of an SIP/IP core network.

Manner 2: the communication between part of the function entities is realized by routing of an SIP/IP core network, and the communication between the function entities except the part of the function entities is realized base on direct communication link between each other or via other forwarding devices.

Manner 3: the communication between all the function entities is realized base on direct communication link between each other or via other forwarding devices except the SIP/IP core network.

As stated above, by means of the technical solutions provided in the embodiments of the disclosure, a large message mode CPM message can be transmitted to an unavailable CPM system recipient by establishing a transmission link between a sender and an IWF according to a session invitation message of the large message mode CPM message, sending the large message mode CPM message to an IWF, forwarding the large message mode CPM message to a non-CPM system with the IWF, and sending the large message mode CPM message to the unavailable CPM system recipient with the non-CPM system, thus solving the problem existing in the related technologies that a large message mode CPM message cannot be sent to a group and consequentially improving user experience.

The mentioned above is only preferred embodiments of the disclosure but not limitation to the disclosure, various modification and variations can be devised by those skilled in this art, and it should be understood that any modification, equivalent and improvement devised without departing from the spirit and scope of the disclosure belong to the protection scope of the disclosure.

What is claimed is:

1. A method for transmitting a large message mode Converged IP Messaging (CPM) message, which is used for transmitting a large message mode CPM message from a CPM client of a sender to a target user, when the target user is an unavailable CPM system user, the method comprising:

respectively establishing a first Message Session Relay Protocol (MSRP) link between the CPM client of the sender and an originating participation function entity, a second MSRP link between the originating participation function entity and a terminating participation function entity, and a third MSRP link between the terminating participation function entity and an inter-working function entity;

obtaining MSRP connection parameters of an opposite end by an establisher of each MSRP link through media negotiations and establishes the MSRP link according to the MSRP connection parameters by an establisher of each segment of MSRP link; and sending the large message mode CPM message by the CPM client of the sender to the inter-working function entity through each established MSRP link in sequence; and performing a protocol conversion on the received large message mode CPM message by the inter-working function entity and then transmitting the converted message to a non-CPM system by the inter-working function entity, wherein a process of media negotiations comprises:

sending, by the CPM client of the sender, a first session invitation message to the originating participation function entity;

sending, by the originating participation function entity, a second session invitation message to the terminating participation function entity;

sending, by the terminating participation function entity, a third session invitation message to a network selection function entity;

selecting, by the network selection function entity, the inter-working function entity according to the third session invitation message, and sending, by the network selection function entity, a fourth session invitation message to the inter-working function entity;

sending, by the inter-working function entity, a fourth success response message including MSRP connection parameters of the inter-working function entity to the network selection function entity;

sending, by the network selection function entity, a third success response message including the MSRP connection parameters of the inter-working function entity to the terminating participation function entity;

sending, by the terminating participation function entity, a second success response message including MSRP connection parameters of the terminating participation function entity to the originating participation function entity; and sending, by the originating participation function entity, a first success response message including the MSRP connection parameters of the originating participation function entity to the CPM client of the sender, wherein the first, second and third MSRP links are established as follows:

the CPM client of the sender establishes the first MSRP link according to the MSRP connection parameters of the originating participation function entity; the originating participation function entity establishes the second MSRP link according to the MSRP connection parameters of the terminating participation function entity; and the terminating participation function entity establishes the third MSRP link according to the MSRP connection parameters of the inter-working function entity;

and wherein during a period between establishing the first MSRP link and establishing the second MSRP link, the method further comprises:

the CPM client of the sender sends a first media transmission request, and the originating participation function entity receives the first media transmission request;

and the MSRP connection parameters of the terminating participation function entity are obtained from the second success response message or from path head information of the first media transmission request;

during a period between establishing the second MSRP link and establishing the third MSRP link, the method further comprises:

the originating participation function entity transmits the media data included in the received first media transmission request via a second media transmission request, the terminating participation function entity receives the second media transmission request;

and the MSRP connection parameters of the inter-working function entity are obtained from the third success response message or from path head information of the second media transmission request.

2. The method according to claim 1, further comprising:
after receiving the first success response message, sending a first acknowledgement message, by the CPM client of the sender, which is received by the originating participation function entity; after receiving the first acknowledgement message, sending a second acknowledgement message, by the originating participation function entity, which is received by the terminating participation function entity; after receiving the second acknowledgement message, sending a third acknowledgement message, by the terminating participation function entity, which is received by the network selection function entity; and after receiving the third acknowledgement message, sending a fourth acknowledgement message, by the network selection function entity, which is received by the inter-working function entity; or after the terminating participation function entity receives the third success response message, sending a third acknowledgement message, by the terminating participation function entity, which is received by the network selection function entity; after the originating participation function entity receives the second success response message, sending a second acknowledgement message, by the originating participation function entity, which is received by the terminating participation function entity; and after the CPM client of the sender receives the first success response message, sending a first acknowledgement message, by the CPM client of the sender, which is received by the originating participation function entity.

3. The method according to claim 2, wherein the first MSRP link is established when the first success response message is received by the client of the sender.

4. The method according to claim 3, wherein
the second MSRP link is established after the originating participation function entity receives the second success response message, or the first acknowledgement message, or an MSRP media transmission request; and
the third MSRP link is established after the terminating participation function entity receives the second acknowledgement message, or the third success response message, or an MSRP media transmission request.

5. A method for transmitting a large message mode Converged IP Messaging (CPM) message, which is used for transmitting a large message mode CPM message from a CPM client of a sender to a target user, when the target user is an unavailable CPM system user, the method comprising:
respectively establishing a first Message Session Relay Protocol (MSRP) link between the CPM client of the sender and an originating participation function entity, a second MSRP link between the originating participation function entity and a terminating participation function entity, and a third MSRP link between the terminating participation function entity and an inter-working function entity;
obtaining MSRP connection parameters of an opposite end by an establisher of each MSRP link through media negotiations and establishes the MSRP link according to the MSRP connection parameters by an establisher of each segment of MSRP link; and
sending the large message mode CPM message by the CPM client of the sender to the inter-working function entity through each established MSRP link in sequence; and performing a protocol conversion on the received large message mode CPM message by the inter-working function entity and then transmitting the converted message to a non-CPM system by the inter-working function entity,
wherein a process of media negotiations comprises:
sending, by the CPM client of the sender, a first session invitation message including MSRP connection parameters of the CPM client of the sender to the originating participation function entity;
sending, by the originating participation function entity, a second session invitation message including MSRP connection parameters of the originating participation function entity to the terminating participation function entity;
sending, by the terminating participation function entity, a third session invitation message including MSRP connection parameters of the terminating participation function entity to a network selection function entity;
selecting, by the network selection function entity, the inter-working function entity according to the third session invitation message, and sending, by the network selection function entity, a fourth session invitation message including the MSRP connection parameters of the terminating participation function entity to the inter-working function entity;
sending, by the inter-working function entity, a fourth success response message to the network selection function entity;
sending, by the network selection function entity, a third success response message to the terminating participation function entity;
sending, by the terminating participation function entity, a second success response message to the originating participation function entity; and
sending, by the originating participation function entity, a first success response message to the CPM client of the sender,
wherein
the first, second and third MSRP links are established as follows:
the originating participation function entity establishes the first MSRP link according to the MSRP connection parameters of the CPM client of the sender; the terminating participation function entity establishes the second MSRP link according to the MSRP connection parameters of the originating participation function entity; and the inter-working function entity establishes the third MSRP link according to the MSRP connection parameters of the terminating participation function entity.

6. The method according to claim 5, further comprising:
after receiving the first success response message, sending a first acknowledgement message, by the CPM client of the sender, which is received by the originating participation function entity; after receiving the first acknowledgement message, sending a second acknowledgement message, by the originating participation function entity, which is received by the terminating participation function entity; after receiving the second acknowledgement message, sending a third acknowledgement message, by the terminating participation function entity, which is received by the network selection function entity; and after receiving the third acknowledgement message, sending a fourth acknowledgement message, by the network selection function entity, which is received by the inter-working function entity; or after the terminating participation function entity receives the third success response message, sending a third acknowledgement message, by the terminating participation function entity, which is received by the network selection function entity; after the originating participation function entity receives the second success response message, sending a second acknowledgement message, by the originating participation function entity, which is received by the terminating participation function entity; and after the CPM client of the sender receives the first success response message, sending a first acknowledgement message, by the CPM client of the sender, which is received by the originating participation function entity;

wherein, the first MSRP link is established after the originating participation function entity receives the first acknowledgement message;

the second MSRP link is established after the terminating participation function entity receives the second acknowledgement message; and the third MSRP link is established after the inter-working function entity receives the fourth acknowledgement message.

7. The method according to claim 1, wherein an establishment process of the MSRP links is as follows:

an establisher achieves establishment by initiating a link establishment request according to the MSRP connection parameters of a neighboring entity; or the establisher selects an existing MSRP link with a matched host, port and/or MSRP URI (Universal Resource Identifier) as an MSRP link to be established.

8. The method according to claim 1, further comprising:

after the non-CPM system receives the large message mode CPM message subjected to a protocol conversion, returning a reception acknowledgement message by the non-CPM system to the inter-working function entity; and after the inter-working function entity receives the reception acknowledgement message, sending an MSRP response message, by the inter-working function entity, which reaches the CPM client of the sender finally.

9. The method according to claim 1, wherein the communication between any two of: the CPM client of the sender, the originating participation function entity, the terminating participation function entity and the inter-working function entity, is realized in any one of the following three manners:

manner 1: the communication between all the function entities is realized via routing of an SIP/IP core network;

manner 2: the communication between part of the function entities is realized via routing of an SIP/IP core network, and the communication between the function entities except the part of the function entities is realized base on direct communication link between each other or via other forwarding devices except for the SIP/IP core network; and manner 3: the communication between all the function entities is realized base on direct communication link between each other or via other forwarding devices except the SIP/IP core network.

10. A method for transmitting a large message mode CPM (Converged IP Messaging) message, which is used for transmitting a large message mode CPM message from a CPM client of a sender to a target group, wherein when a recipient is an unavailable CPM system user in the target group, the method comprises:

respectively establishing a first Message Session Relay Protocol (MSRP) link between a CPM client of a sender and an originating participation function entity, a second MSRP link between the originating participation function entity and a CPM control function entity, a third MSRP link between the CPM control function entity and a terminating participation function entity, and a fourth MSRP link between the terminating participation function entity and an inter-working function entity;

obtaining MSRP connection parameters of the opposite end by the establisher of each MSRP link through media negotiations and establishes the MSRP link according to the MSRP connection parameters by the establisher of each MSRP link;

sending the large message mode CPM message by the CPM client of the sender to the inter-working function entity through each established MSRP link in sequence; and performing a protocol conversion on the received large message mode CPM message by the inter-working function entity and then transmitting the converted message to a non-CPM system by the inter-working function entity;

wherein a process of media negotiations comprises:

sending, by the CPM client of the sender, a first session invitation message to the originating participation function entity;

sending, by the originating participation function entity, a second session invitation message to the CPM control function entity;

sending, by the CPM control function entity, the a third session invitation message to the terminating participation function entity;

sending, by the terminating participation function entity, a fourth invitation session message to a network selection function entity;

selecting, by the network selection function entity, the inter-working function entity according to the fourth session invitation message, and sending, by the network selection function entity, a fifth session invitation message to the inter-working function entity;

sending, by the inter-working function entity, a fifth success response message including MSRP connection parameters of the inter-working function entity to the network selection function entity;

sending, by the network selection function entity, a fourth success response message including the MSRP connection parameters of the inter-working function entity to the terminating participation function entity;

sending, by the terminating participation function entity, a third success response message including MSRP connection parameters of the terminating participation function entity to the CPM control function entity;

sending, by the CPM control function entity, a second success response message including MSRP connection parameters of the CPM control function entity to the originating participation function entity; and sending, by the originating participation function entity, a first success response message including the MSRP connection parameters of the originating participation function entity to the CPM client of the sender, wherein the first, second, third and fourth MSRP links are established as follows: the CPM client of the sender establishes the first MSRP link according to the MSRP connection parameters of the originating participation function entity; the originating participation function entity establishes the second MSRP link according to the MSRP connection parameters of the CPM control function entity; the CPM control function entity establishes the third MSRP links according to the MSRP connection parameters of the terminating participation function entity; and the terminating participation function entity establishes the fourth MSRP link according to the MSRP connection parameters of the inter-working function entity; and wherein during a period between establishing the first MSRP link and establishing the second MSRP link, the method further comprises:

the CPM client of the sender sends a first media transmission request, the originating participation function entity receives the first media transmission request; and the MSRP connection parameters of the CPM control function entity are obtained from the second success response message or from path head information of the first media transmission request;

during a period between establishing the second MSRP link and establishing the third MSRP link, the method further comprises:

the originating participation function entity transmits the media data included in the received first media transmission request via a second media transmission request, the CPM control function entity receives the second media transmission request;

and the MSRP connection parameters of the terminating participation function entity are obtained from the third success response message or from path head information of the second media transmission request;

during a period between establishing the third MSRP link and establishing the fourth MSRP link, the method further comprises:

the CPM control function entity transmits the media data included in the received second media transmission request via a third media transmission request, the terminating participation function entity receives the third media transmission request;

and the MSRP connection parameters of the inter-working function entity are obtained from the fourth success response message or from path head information of the third media transmission request.

11. The method according to claim 10, further comprising:
after the CPM client of the sender receives the first success response message, sending a first acknowledgement message, by the CPM client of the sender, which is received by the originating participation function entity; after the originating participation function entity receives the first acknowledgement message, sending a second acknowledgement message, by the originating participation function entity, which is received by the CPM control function entity; after the CPM control function entity receives the second acknowledgement message, sending a third acknowledgement message, by the CPM control function entity, which is received by the terminating participation function entity; after the terminating participation function entity receives the third acknowledgement message, sending a fourth acknowledgement message, by the terminating participation function entity, which is received by the network selection function entity; and after the network selection function entity receives the fourth acknowledgement message, sending a fifth acknowledgement message, by the network selection function entity, which is received by the inter-working function entity; or after the terminating participation function entity receives the fourth success response message, sending a fourth acknowledgement message, by the terminating participation function entity, which is received by the network selection function entity; after the network selection function entity receives the fourth acknowledgement message, sending a fifth acknowledgement message, by the network selection function entity, which is received by the inter-working function entity; after the CPM control function entity receives the third success response message, sending a third acknowledgement message, by the CPM control function entity, which is received by the terminating participation function entity; after the originating participation function entity receives the second success response message, sending a second acknowledgement message, by the originating participation function entity, which is received by the CPM control function entity; and after the CPM client of the sender receives the first success response message, sending a first acknowledgement message, by the CPM client of the sender, which is received by the originating participation function entity.

12. The method according to claim 11, wherein the first MSRP link is established when the first success response message is received by the client of the sender.

13. The method according to claim 12, wherein the third MSRP link is established when the CPM control function entity receives the third success response message or the second acknowledgement message.

14. The method according to claim 13, wherein
the second MSRP link is established after the originating participation function entity receives the second success response message, or the first acknowledgement message, or an MSRP media transmission request; and the fourth MSRP link is established when the terminating participation function entity receives the third acknowledgement message or the fourth success response message, or an MSRP media transmission request.

15. A method for transmitting a large message mode CPM (Converged IP Messaging) message, which is used for transmitting a large message mode CPM message from a CPM client of a sender to a target group, wherein when a recipient is an unavailable CPM system user in the target group, the method comprises:

respectively establishing a first Message Session Relay Protocol (MSRP) link between a CPM client of a sender and an originating participation function entity, a second MSRP link between the originating participation function entity and a CPM control function entity, a third MSRP link between the CPM control function entity and a terminating participation function entity, and a fourth MSRP link between the terminating participation function entity and an inter-working function entity;

obtaining MSRP connection parameters of the opposite end by the establisher of each MSRP link through media negotiations and establishes the MSRP link according to the MSRP connection parameters by the establisher of each MSRP link;

sending the large message mode CPM message by the CPM client of the sender to the inter-working function entity through each established MSRP link in sequence; and performing a protocol conversion on the received large message mode CPM message by the inter-working function entity and then transmitting the converted message to a non-CPM system by the inter-working function entity;

wherein a process of media negotiations comprises:

sending, by the CPM client of the sender, a first session invitation message including MSRP connection parameters of the CPM client of the sender to the originating participation function entity;

sending, by the originating participation function entity, a second session invitation message including MSRP connection parameters of the originating participation function entity to the CPM control function entity;

sending, by the CPM control function entity, the a third session invitation message including MSRP connection parameters of the CPM control function entity to the terminating participation function entity;

sending, by the terminating participation function entity, a fourth invitation session message including MSRP connection parameters of the terminating participation function entity to a network selection function entity;

selecting, by the network selection function entity, the inter-workinq function entity according to the fourth session invitation message, and sending, by the network selection function entity, a fifth session invitation message including the MSRP connection parameters of the terminating participation function entity to the inter-working function entity;

sending, by the inter-working function entity, a fifth success response message to the network selection function entity;

sending, by the network selection function entity, a fourth success response message to the terminating participation function entity;

sending, by the terminating participation function entity, a third success response message to the CPM control function entity;

sending, by the CPM control function entity, a second success response message to the originating participation function entity; and sending, by the originating participation function entity, a first success response message to the CPM client of the sender, wherein the first, second, third and fourth MSRP links are established as follows:

the originating participation function entity establishes the first MSRP link according to the MSRP connection parameters of the CPM client of the sender; the CPM control function entity establishes the second MSRP link according to the MSRP connection parameters of the originating participation function entity, the terminating participation function entity establishes the third MSRP links according to the MSRP connection parameters of the CPM control function entity; and the inter-working function entity establishes the fourth MSRP link according to the MSRP connection parameters of the terminating participation function entity.

16. The method according to claim 15, further comprising:

after the CPM client of the sender receives the first success response message, sending a first acknowledgement message, by the CPM client of the sender, which is received by the originating participation function entity; after the originating participation function entity receives the first acknowledgement message, sending a second acknowledgement message, by the originating participation function entity, which is received by the CPM control function entity; after the CPM control function entity receives the second acknowledgement message, sending a third acknowledgement message, by the CPM control function entity, which is received by the terminating participation function entity; after the terminating participation function entity receives the third acknowledgement message, sending a fourth acknowledgement message, by the terminating participation function entity, which is received by the network selection function entity; and after the network selection function entity receives the fourth acknowledgement message, sending a fifth acknowledgement message, by the network selection function entity, which is received by the inter-working function entity; or after the terminating participation function entity receives the fourth success response message, sending a fourth acknowledgement message, by the terminating participation function entity, which is received by the network selection function entity; after the network selection function entity receives the fourth acknowledgement message, sending a fifth acknowledgement message, by the network selection function entity, which is received by the inter-working function entity; after the CPM control function entity receives the third success response message, sending a third acknowledgement message, by the CPM control function entity, which is received by the terminating participation function entity; after the originating participation function entity receives the second success response message, sending a second acknowledgement message, by the originating participation function entity, which is received by the CPM control function entity; and after the CPM client of the sender receives the first success response message, sending a first acknowledgement message, by the CPM client of the sender, which is received by the originating participation function entity;

wherein, the first MSRP link is established after the originating participation function entity receives the first acknowledgement message;

the second MSRP link is established after the CPM control function entity receives the second acknowledgement message;

the third MSRP link is established after the terminating participation function entity receives the third acknowledgement message; and the fourth MSRP link is established after the inter-working function entity receives the fifth acknowledgement message.

17. The method according to claim 10, wherein an establishment process of the MSRP links is as follows:

an establisher achieves establishment by initiating a link establishment request according to the MSRP connection parameters of an opposite end; or the establisher selects an existing MSRP link with a matched host, port and/or MSRP URI (Universal Resource Identifier) as an MSRP link to be established.

18. The method according to claim 10, further comprising:

after the non-CPM system receives the large message mode CPM message subjected to a protocol conversion, returning a reception acknowledgement message by the non-CPM system to the inter-working function entity; and after the inter-working function entity receives the reception acknowledgement message, sending an MSRP response message, by the inter-working function entity, which reaches the CPM client of the sender finally.

19. The method according to claim 10, wherein the communication between any two of: the CPM client of the sender, the originating participation function entity, the CPM control function entity, the terminating participation function entity, the selection function entity and the inter-working function entity is realized in any one of the following three manners:
- manner 1: the communication between all the function entities is realized via routing of an SIP/IP core network;
- manner 2: the communication between part of the function entities is realized via routing of an SIP/IP core network, and the communication between the function entities except the part of the function entities is realized base on direct communication link between each other or via other forwarding devices except for the SIP/IP core network; and
- manner 3: the communication between all the function entities is realized base on direct communication link between each other or via other forwarding devices except the SIP/IP core network.

* * * * *